United States Patent
Iwamura et al.

(10) Patent No.: US 10,020,982 B2
(45) Date of Patent: Jul. 10, 2018

(54) FAILURE ISOLATION METHOD AND MANAGEMENT SERVER FOR FAILURE ISOLATION

(71) Applicant: Hitachi, Ltd., Tokyo (JP)

(72) Inventors: Atsushi Iwamura, Tokyo (JP); Yoshiko Yasuda, Tokyo (JP); Hideaki Tsushima, Tokyo (JP); Hideaki Ishii, Tokyo (JP); Atsushi Komatsuzawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 15/071,241

(22) Filed: Mar. 16, 2016

(65) Prior Publication Data
US 2017/0099179 A1    Apr. 6, 2017

(30) Foreign Application Priority Data
Oct. 2, 2015    (JP) .................. 2015-196596

(51) Int. Cl.
G06F 17/00    (2006.01)
H04L 12/24    (2006.01)
H04L 12/26    (2006.01)

(52) U.S. Cl.
CPC ...... *H04L 41/0631* (2013.01); *H04L 41/0659* (2013.01); *H04L 43/08* (2013.01)

(58) Field of Classification Search
None
See application file for complete search history.

(56) References Cited

U.S. PATENT DOCUMENTS

| 6,938,021 | B2* | 8/2005 | Shear ................ G06Q 20/3674 705/67 |
| 7,143,066 | B2* | 11/2006 | Shear ................ G06Q 20/3674 705/54 |
| 2009/0172687 | A1* | 7/2009 | Bobak .................. G06Q 10/06 718/104 |
| 2009/0313198 | A1* | 12/2009 | Kudo .................. G06F 11/0709 706/47 |
| 2014/0046722 | A1* | 2/2014 | Rosenbloom ......... G06F 19/327 705/7.28 |

(Continued)

FOREIGN PATENT DOCUMENTS

JP    2012-256355 A    12/2012

*Primary Examiner* — Natisha Cox
(74) *Attorney, Agent, or Firm* — Mattingly & Malur, PC

(57) ABSTRACT

The failure isolation method includes: a first step of performing a predetermined action for the monitoring target, collecting a failure event which is a result of the action, applying the failure event to a failure cause analysis rule, and narrowing down the root cause events together with certainty factors; a second step of determining whether the root cause event and the certainty factor narrowed down in the first step satisfy a predetermined requirement and whether the narrowing-down has been completed; and a third step of, when it is determined in the second step that the narrowing-down has not been completed, performing a predetermined additional action for the monitoring target, collecting an additional failure event which is a result of the additional action, applying the additional failure event to the failure cause analysis rule, and narrowing down the root cause events together with the certainty factors.

15 Claims, 37 Drawing Sheets

(56) References Cited

U.S. PATENT DOCUMENTS

2015/0181022 A1\* 6/2015 Vaderna ................ H04W 24/10
                                                                                                                     455/422.1
2016/0320768 A1\* 11/2016 Zhao .................... G05B 19/406

\* cited by examiner

Fig.4

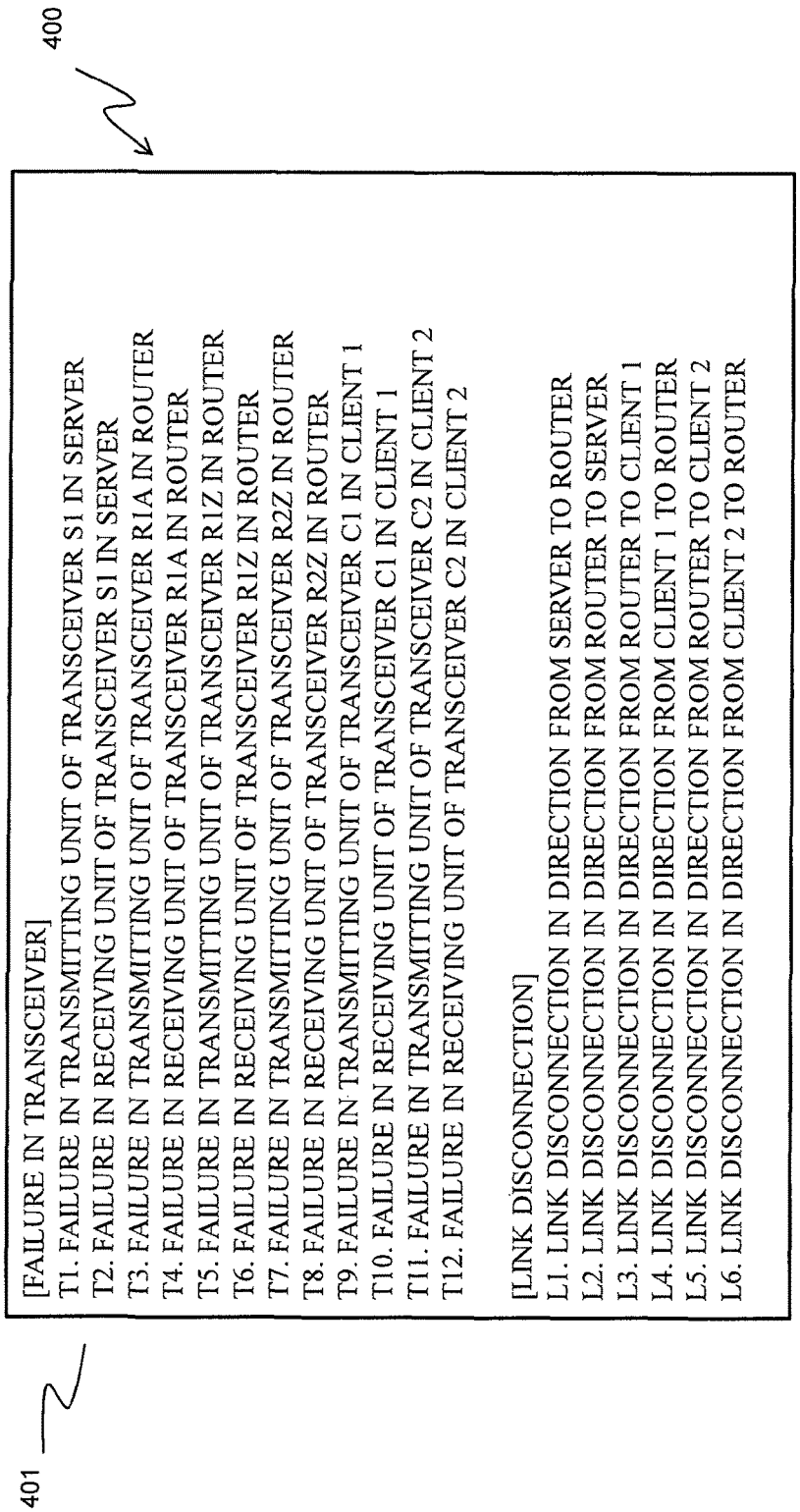

400

[FAILURE IN TRANSCEIVER]
T1. FAILURE IN TRANSMITTING UNIT OF TRANSCEIVER S1 IN SERVER
T2. FAILURE IN RECEIVING UNIT OF TRANSCEIVER S1 IN SERVER
T3. FAILURE IN TRANSMITTING UNIT OF TRANSCEIVER R1A IN ROUTER
T4. FAILURE IN RECEIVING UNIT OF TRANSCEIVER R1A IN ROUTER
T5. FAILURE IN TRANSMITTING UNIT OF TRANSCEIVER R1Z IN ROUTER
T6. FAILURE IN RECEIVING UNIT OF TRANSCEIVER R1Z IN ROUTER
T7. FAILURE IN TRANSMITTING UNIT OF TRANSCEIVER R2Z IN ROUTER
T8. FAILURE IN RECEIVING UNIT OF TRANSCEIVER R2Z IN ROUTER
T9. FAILURE IN TRANSMITTING UNIT OF TRANSCEIVER C1 IN CLIENT 1
T10. FAILURE IN RECEIVING UNIT OF TRANSCEIVER C1 IN CLIENT 1
T11. FAILURE IN TRANSMITTING UNIT OF TRANSCEIVER C2 IN CLIENT 2
T12. FAILURE IN RECEIVING UNIT OF TRANSCEIVER C2 IN CLIENT 2

[LINK DISCONNECTION]
L1. LINK DISCONNECTION IN DIRECTION FROM SERVER TO ROUTER
L2. LINK DISCONNECTION IN DIRECTION FROM ROUTER TO SERVER
L3. LINK DISCONNECTION IN DIRECTION FROM ROUTER TO CLIENT 1
L4. LINK DISCONNECTION IN DIRECTION FROM CLIENT 1 TO ROUTER
L5. LINK DISCONNECTION IN DIRECTION FROM ROUTER TO CLIENT 2
L6. LINK DISCONNECTION IN DIRECTION FROM CLIENT 2 TO ROUTER

[FAILURE (2) IN TRANSCEIVER]

T4. FAILURE IN RECEIVING UNIT OF TRANSCEIVER R1A IN ROUTER
(C-T4.1A: SIGNAL INTERRUPTION FROM CLIENT 1 IN SERVER (TWO-WAY SIGNAL)
OR C-T4.1B: SIGNAL INTERRUPTION FROM CLIENT 2 IN SERVER (TWO-WAY SIGNAL))
AND C-T4.2: SIGNAL INTERRUPTION BETWEEN SERVER AND ROUTER (TWO-WAY SIGNAL)
AND C-T4.3: SIGNAL INTERRUPTION IN DIRECTION FROM ROUTER TO SERVER (ONE-WAY SIGNAL)
AND C-T4.4: ALERT FOR RECEPTION ABNORMALITY IN TRANSCEIVER R1A OF ROUTER

T5. FAILURE IN TRANSMITTING UNIT OF TRANSCEIVER R1Z IN ROUTER
C-T5.1: SIGNAL INTERRUPTION FROM CLIENT 1 IN SERVER (TWO-WAY SIGNAL)
AND C-T5.2: SIGNAL INTERRUPTION BETWEEN CLIENT 1 AND ROUTER (TWO-WAY SIGNAL)
AND C-T5.3: SIGNAL INTERRUPTION IN DIRECTION FROM ROUTER TO CLIENT 1 (ONE-WAY SIGNAL)
AND C-T5.4: ALERT FOR TRANSMISSION ABNORMALITY IN TRANSCEIVER R1Z OF ROUTER

T6. FAILURE IN RECEIVING UNIT OF TRANSCEIVER R1Z IN ROUTER
C-T6.1: SIGNAL INTERRUPTION FROM CLIENT 1 IN SERVER (TWO-WAY SIGNAL)
AND C-T6.2: SIGNAL INTERRUPTION BETWEEN ROUTER AND CLIENT 1 (TWO-WAY SIGNAL)
AND C-T6.3: SIGNAL INTERRUPTION IN DIRECTION FROM CLIENT 1 TO ROUTER (ONE-WAY SIGNAL)
AND C-T6.4: ALERT FOR RECEPTION ABNORMALITY IN TRANSCEIVER R1Z OF ROUTER

Fig. 6A

[LINK DISCONNECTION (1)]

L1. LINK DISCONNECTION IN DIRECTION FROM SERVER TO ROUTER
(C-L1.1A: SIGNAL INTERRUPTION FROM CLIENT 1 IN SERVER (TWO-WAY SIGNAL)
OR C-L1.1B: SIGNAL INTERRUPTION FROM CLIENT 2 IN SERVER (TWO-WAY SIGNAL))
AND C-L1.2: SIGNAL INTERRUPTION BETWEEN SERVER AND ROUTER (TWO-WAY SIGNAL)
AND C-L1.3: SIGNAL INTERRUPTION IN DIRECTION FROM SERVER TO ROUTER (ONE-WAY SIGNAL)
AND (C-L1.4A: NO ALERT FOR TRANSMISSION ABNORMALITY IN TRANSCEIVER S1 OF SERVER AND C-L1.4B: NO ALERT FOR RECEPTION ABNORMALITY IN TRANSCEIVER R1A OF ROUTER)

L2. LINK DISCONNECTION IN DIRECTION FROM ROUTER TO SERVER
(C-L2.1A: SIGNAL INTERRUPTION FROM CLIENT 1 IN SERVER (TWO-WAY SIGNAL)
OR C-L2.1B: SIGNAL INTERRUPTION FROM CLIENT 1 IN SERVER (TWO-WAY SIGNAL))
AND C-L2.2: SIGNAL INTERRUPTION BETWEEN SERVER AND ROUTER (TWO-WAY SIGNAL)
AND C-L2.3: SIGNAL INTERRUPTION IN DIRECTION FROM ROUTER TO SERVER (ONE-WAY SIGNAL)
AND (C-L2.4A: NO ALERT FOR RECEPTION ABNORMALITY IN TRANSCEIVER S1 OF SERVER AND C-L2.4B: NO ALERT FOR TRANSMISSION ABNORMALITY IN TRANSCEIVER R1A OF ROUTER)

L3. LINK DISCONNECTION IN DIRECTION FROM ROUTER TO CLIENT 1
C-L3.1: SIGNAL INTERRUPTION FROM CLIENT 1 IN SERVER (TWO-WAY SIGNAL)
AND C-L3.2: SIGNAL INTERRUPTION BETWEEN SERVER AND CLIENT 1 (TWO-WAY SIGNAL)
AND C-L3.3: SIGNAL INTERRUPTION IN DIRECTION FROM ROUTER TO CLIENT 1 (ONE-WAY SIGNAL)
AND (C-L3.4A: NO ALERT FOR TRANSMISSION ABNORMALITY IN TRANSCEIVER R1Z OF ROUTER AND C-L3.4B: NO ALERT FOR RECEPTION ABNORMALITY IN TRANSCEIVER C1 OF CLIENT 1)

[LINK DISCONNECTION (2)]

L4. LINK DISCONNECTION IN DIRECTION FROM CLIENT 1 TO ROUTER
C-L4.1: SIGNAL INTERRUPTION FROM CLIENT 1 IN SERVER (TWO-WAY SIGNAL)
AND C-L4.2: SIGNAL INTERRUPTION BETWEEN ROUTER AND CLIENT 1 (TWO-WAY SIGNAL)
AND C-L4.3: SIGNAL INTERRUPTION IN DIRECTION FROM CLIENT 1 TO ROUTER (ONE-WAY SIGNAL)
AND (C-L4.4A: NO ALERT FOR RECEPTION ABNORMALITY IN TRANSCEIVER R1Z OF ROUTER AND C-L4.4B: NO ALERT FOR TRANSMISSION ABNORMALITY IN TRANSCEIVER C1 OF CLIENT 1)

L5. LINK DISCONNECTION IN DIRECTION FROM ROUTER TO CLIENT 2
C-L5.1: SIGNAL INTERRUPTION FROM CLIENT 2 IN SERVER (TWO-WAY SIGNAL)
AND C-L5.2: SIGNAL INTERRUPTION BETWEEN ROUTER AND CLIENT 2 (TWO-WAY SIGNAL)
AND C-L5.3: SIGNAL INTERRUPTION IN DIRECTION FROM ROUTER TO CLIENT 2 (ONE-WAY SIGNAL)
AND (C-L5.4A: NO ALERT FOR TRANSMISSION ABNORMALITY IN TRANSCEIVER R2Z OF ROUTER
AND C-L5.4B: NO ALERT FOR RECEPTION ABNORMALITY IN TRANSCEIVER C2 OF CLIENT 2)

L6. LINK DISCONNECTION IN DIRECTION FROM CLIENT 2 TO ROUTER
C-L6.1: SIGNAL INTERRUPTION FROM CLIENT 2 IN SERVER (TWO-WAY SIGNAL)
AND C-L6.2: SIGNAL INTERRUPTION BETWEEN ROUTER AND CLIENT 2 (TWO-WAY SIGNAL)
AND C-L6.3: SIGNAL INTERRUPTION IN DIRECTION FROM CLIENT 2 TO ROUTER (ONE-WAY SIGNAL)
AND (C-L6.4A: NO ALERT FOR RECEPTION ABNORMALITY IN TRANSCEIVER R2Z OF ROUTER AND C-L5.4B: NO ALERT FOR TRANSMISSION ABNORMALITY IN TRANSCEIVER C2 OF CLIENT 2)

Fig. 7

Table 701:

| FAILURE EVENT NUMBER | CONTENT |
|---|---|
| EV-LNP1. 1 | SIGNAL INTERRUPTION FROM CLIENT 1 IN SERVER (TWO-WAY SIGNAL) |
| EV-LNP2. 1 | SIGNAL INTERRUPTION FROM CLIENT 2 IN SERVER (TWO-WAY SIGNAL) |
| EV-LNS1. 1 | SIGNAL INTERRUPTION BETWEEN SERVER AND ROUTER (TWO-WAY SIGNAL) |
| EV-LNS1. 2 | SIGNAL INTERRUPTION IN DIRECTION FROM SERVER TO ROUTER (ONE-WAY SIGNAL) |
| EV-LNS1. 3 | SIGNAL INTERRUPTION IN DIRECTION FROM ROUTER TO SERVER (ONE-WAY SIGNAL) |
| EV-LNS2. 1 | SIGNAL INTERRUPTION BETWEEN ROUTER AND CLIENT 1 (TWO-WAY SIGNAL) |
| EV-LNS2. 2 | SIGNAL INTERRUPTION IN DIRECTION FROM ROUTER TO CLIENT 1 (ONE-WAY SIGNAL) |
| EV-LNS2. 3 | SIGNAL INTERRUPTION IN DIRECTION FROM CLIENT 1 TO ROUTER (ONE-WAY SIGNAL) |
| EV-LNS3. 1 | SIGNAL INTERRUPTION BETWEEN ROUTER AND CLIENT 2 (TWO-WAY SIGNAL) |
| EV-LNS3. 2 | SIGNAL INTERRUPTION IN DIRECTION FROM ROUTER TO CLIENT 2 (ONE-WAY SIGNAL) |
| EV-LNS3. 3 | SIGNAL INTERRUPTION IN DIRECTION FROM CLIENT 2 TO ROUTER (ONE-WAY SIGNAL) |
| EV-TNC1. 1 | ALERT FOR RECEPTION ABNORMALITY IN TRANSCEIVER C1 OF CLIENT 1 |
| EV-TNC1. 1p | NO ALERT FOR RECEPTION ABNORMALITY IN TRANSCEIVER C1 OF CLIENT 1 |
| EV-TNC1. 2 | ALERT FOR TRANSMISSION ABNORMALITY IN TRANSCEIVER C1 OF CLIENT 1 |
| EV-TNC1. 2p | NO ALERT FOR TRANSMISSION ABNORMALITY IN TRANSCEIVER C1 OF CLIENT 1 |
| EV-TNC2. 1 | ALERT FOR RECEPTION ABNORMALITY IN TRANSCEIVER C2 OF CLIENT 2 |
| EV-TNC2. 1p | NO ALERT FOR RECEPTION ABNORMALITY IN TRANSCEIVER C2 OF CLIENT 2 |
| EV-TNC2. 2 | ALERT FOR TRANSMISSION ABNORMALITY IN TRANSCEIVER C2 OF CLIENT 2 |
| EV-TNC2. 2p | NO ALERT FOR TRANSMISSION ABNORMALITY IN TRANSCEIVER C2 OF CLIENT 2 |

Table 702:

| FAILURE EVENT NUMBER | CONTENT |
|---|---|
| EV-TNR1A. 1 | ALERT FOR RECEPTION ABNORMALITY IN TRANSCEIVER R1A OF ROUTER |
| EV-TNR1A. 1p | NO ALERT FOR RECEPTION ABNORMALITY IN TRANSCEIVER R1A OF ROUTER |
| EV-TNR1A. 2 | ALERT FOR TRANSMISSION ABNORMALITY IN TRANSCEIVER R1A OF ROUTER |
| EV-TNR1A. 2p | NO ALERT FOR TRANSMISSION ABNORMALITY IN TRANSCEIVER R1A OF ROUTER |
| EV-TNR1Z. 1 | ALERT FOR RECEPTION ABNORMALITY IN TRANSCEIVER R1Z OF ROUTER |
| EV-TNR1Z. 1p | NO ALERT FOR RECEPTION ABNORMALITY IN TRANSCEIVER R1Z OF ROUTER |
| EV-TNR1Z. 2 | ALERT FOR TRANSMISSION ABNORMALITY IN TRANSCEIVER R1Z OF ROUTER |
| EV-TNR1Z. 2p | NO ALERT FOR TRANSMISSION ABNORMALITY IN TRANSCEIVER R1Z OF ROUTER |
| EV-TNR2Z. 1 | ALERT FOR RECEPTION ABNORMALITY IN TRANSCEIVER R2Z OF ROUTER |
| EV-TNR2Z. 1p | NO ALERT FOR RECEPTION ABNORMALITY IN TRANSCEIVER R2Z OF ROUTER |
| EV-TNR2Z. 2 | ALERT FOR TRANSMISSION ABNORMALITY IN TRANSCEIVER R2Z OF ROUTER |
| EV-TNR2Z. 2p | NO ALERT FOR TRANSMISSION ABNORMALITY IN TRANSCEIVER R2Z OF ROUTER |
| EV-TNS1. 1 | ALERT FOR RECEPTION ABNORMALITY IN TRANSCEIVER S1 OF SERVER |
| EV-TNS1. 1p | NO ALERT FOR RECEPTION ABNORMALITY IN TRANSCEIVER S1 OF SERVER |
| EV-TNS1. 2 | ALERT FOR TRANSMISSION ABNORMALITY IN TRANSCEIVER S1 OF SERVER |
| EV-TNS1. 2p | NO ALERT FOR TRANSMISSION ABNORMALITY IN TRANSCEIVER S1 OF SERVER |

Table 900 — columns: ROOT CAUSE EVENT NUMBER (401) | NARROWING-DOWN LEVEL (901) | ADDITIONAL ACTION NUMBER (902) | CONTENT OF ADDITIONAL ACTION (903)

| ROOT CAUSE EVENT NUMBER | NARROWING-DOWN LEVEL | ADDITIONAL ACTION NUMBER | CONTENT OF ADDITIONAL ACTION |
|---|---|---|---|
| L1 | 2 | AC—LNS1.1 | GENERATION OF CONNECTION CHECK SIGNAL BETWEEN SERVER AND ROUTER (TWO-WAY SIGNAL) |
| L1 | 3 | AC—LNS1.2 | GENERATION OF CONNECTION CHECK SIGNAL IN DIRECTION FROM SERVER TO ROUTER (ONE-WAY SIGNAL) |
| L1 | 4 | AC—TNS1.2 | COLLECTION OF ALERT FOR ABNORMALITY IN TRANSMITTING UNIT OF TRANSCEIVER S1 IN SERVER |
| L1 | 4 | AC—TNR1A.1 | COLLECTION OF ALERT FOR ABNORMALITY IN RECEIVING UNIT OF TRANSCEIVER R1A IN ROUTER |
| L2 | 2 | AC—LNS1.1 | GENERATION OF CONNECTION CHECK SIGNAL BETWEEN SERVER AND ROUTER (TWO-WAY SIGNAL) |
| L2 | 3 | AC—LNS1.3 | GENERATION OF CONNECTION CHECK SIGNAL IN DIRECTION FROM ROUTER TO SERVER (ONE-WAY SIGNAL) |
| L2 | 4 | AC—TNS1.1 | COLLECTION OF ALERT FOR ABNORMALITY IN RECEIVING UNIT OF TRANSCEIVER S1 IN SERVER |
| L2 | 4 | AC—TNR1A.2 | COLLECTION OF ALERT FOR ABNORMALITY IN TRANSMITTING UNIT OF TRANSCEIVER R1A IN ROUTER |
| L3 | 2 | AC—LNS2.1 | GENERATION OF CONNECTION CHECK SIGNAL BETWEEN ROUTER AND CLIENT 1 (TWO-WAY SIGNAL) |
| L3 | 3 | AC—LNS2.2 | GENERATION OF CONNECTION CHECK SIGNAL IN DIRECTION FROM ROUTER TO CLIENT 1 (ONE-WAY SIGNAL) |
| L3 | 4 | AC—TNR1Z.2 | COLLECTION OF ALERT FOR ABNORMALITY IN TRANSMITTING UNIT OF TRANSCEIVER R1Z IN ROUTER |
| L3 | 4 | AC—TNC1.1 | COLLECTION OF ALERT FOR ABNORMALITY IN RECEIVING UNIT OF TRANSCEIVER C1 IN CLIENT 1 |
| L4 | 2 | AC—LNS2.1 | GENERATION OF CONNECTION CHECK SIGNAL BETWEEN ROUTER AND CLIENT 1 (TWO-WAY SIGNAL) |
| L4 | 3 | AC—LNS2.3 | GENERATION OF CONNECTION CHECK SIGNAL IN DIRECTION FROM CLIENT 1 TO ROUTER (ONE-WAY SIGNAL) |
| L4 | 4 | AC—TNR1Z.1 | COLLECTION OF ALERT FOR ABNORMALITY IN RECEIVING UNIT OF TRANSCEIVER R1Z IN ROUTER |
| L4 | 4 | AC—TNC1.2 | COLLECTION OF ALERT FOR ABNORMALITY IN TRANSMITTING UNIT OF TRANSCEIVER C1 IN CLIENT 1 |
| L5 | 2 | AC—LNS3.1 | GENERATION OF CONNECTION CHECK SIGNAL BETWEEN ROUTER AND CLIENT 2 (TWO-WAY SIGNAL) |
| L5 | 3 | AC—LNS3.2 | GENERATION OF CONNECTION CHECK SIGNAL IN DIRECTION FROM ROUTER TO CLIENT 2 (ONE-WAY SIGNAL) |
| L5 | 4 | AC—TNR2Z.2 | COLLECTION OF ALERT FOR ABNORMALITY IN TRANSMITTING UNIT OF TRANSCEIVER R2Z IN ROUTER |
| L5 | 4 | AC—TNC2.1 | COLLECTION OF ALERT FOR ABNORMALITY IN RECEIVING UNIT OF TRANSCEIVER C2 IN CLIENT 2 |
| L6 | 2 | AC—LNS3.1 | GENERATION OF CONNECTION CHECK SIGNAL BETWEEN ROUTER AND CLIENT 2 (TWO-WAY SIGNAL) |
| L6 | 3 | AC—LNS3.3 | GENERATION OF CONNECTION CHECK SIGNAL IN DIRECTION FROM CLIENT 2 TO ROUTER (ONE-WAY SIGNAL) |
| L6 | 4 | AC—TNR2Z.1 | COLLECTION OF ALERT FOR ABNORMALITY IN RECEIVING UNIT OF TRANSCEIVER R2Z IN ROUTER |
| L6 | 4 | AC—TNC2.2 | COLLECTION OF ALERT FOR ABNORMALITY IN TRANSMITTING UNIT OF TRANSCEIVER C2 IN CLIENT 2 |

Fig. 9B

| ROOT CAUSE EVENT NUMBER | NARROWING-DOWN LEVEL | ADDITIONAL ACTION NUMBER | CONTENT OF ADDITIONAL ACTION |
|---|---|---|---|
| T1 | 2 | AC-LNS1.1 | GENERATION OF CONNECTION CHECK SIGNAL BETWEEN SERVER AND ROUTER (TWO-WAY SIGNAL) |
| T1 | 3 | AC-LNS1.2 | GENERATION OF CONNECTION CHECK SIGNAL IN DIRECTION FROM SERVER TO ROUTER (ONE-WAY SIGNAL) |
| T1 | 4 | AC-TNS1.2 | COLLECTION OF ALERT FOR ABNORMALITY IN TRANSMITTING UNIT OF TRANSCEIVER S1 IN SERVER |
| T10 | 2 | AC-LNS2.1 | GENERATION OF CONNECTION CHECK SIGNAL BETWEEN ROUTER AND CLIENT 1 (TWO-WAY SIGNAL) |
| T10 | 3 | AC-LNS2.2 | GENERATION OF CONNECTION CHECK SIGNAL IN DIRECTION FROM ROUTER TO CLIENT 1 (ONE-WAY SIGNAL) |
| T10 | 4 | AC-TNC1.1 | COLLECTION OF ALERT FOR ABNORMALITY IN RECEIVING UNIT OF TRANSCEIVER C1 IN CLIENT 1 |
| T11 | 2 | AC-LNS3.1 | GENERATION OF CONNECTION CHECK SIGNAL BETWEEN ROUTER AND CLIENT 2 (TWO-WAY SIGNAL) |
| T11 | 3 | AC-LNS3.3 | GENERATION OF CONNECTION CHECK SIGNAL IN DIRECTION FROM CLIENT 2 TO ROUTER (ONE-WAY SIGNAL) |
| T11 | 4 | AC-TNC2.2 | COLLECTION OF ALERT FOR ABNORMALITY IN TRANSMITTING UNIT OF TRANSCEIVER C2 IN CLIENT 2 |
| T12 | 2 | AC-LNS3.1 | GENERATION OF CONNECTION CHECK SIGNAL BETWEEN ROUTER AND CLIENT 2 (TWO-WAY SIGNAL) |
| T12 | 3 | AC-LNS3.2 | GENERATION OF CONNECTION CHECK SIGNAL IN DIRECTION FROM ROUTER TO CLIENT 2 (ONE-WAY SIGNAL) |
| T12 | 4 | AC-TNC2.1 | COLLECTION OF ALERT FOR ABNORMALITY IN RECEIVING UNIT OF TRANSCEIVER C2 IN CLIENT 2 |
| T2 | 2 | AC-LNS1.1 | GENERATION OF CONNECTION CHECK SIGNAL BETWEEN SERVER AND ROUTER (TWO-WAY SIGNAL) |
| T2 | 3 | AC-LNS1.3 | GENERATION OF CONNECTION CHECK SIGNAL IN DIRECTION FROM ROUTER TO SERVER (ONE-WAY SIGNAL) |
| T2 | 4 | AC-TNS1.1 | COLLECTION OF ALERT FOR ABNORMALITY IN RECEIVING UNIT OF TRANSCEIVER S1 IN SERVER |
| T3 | 2 | AC-LNS1.1 | GENERATION OF CONNECTION CHECK SIGNAL BETWEEN SERVER AND ROUTER (TWO-WAY SIGNAL) |
| T3 | 3 | AC-LNS1.2 | GENERATION OF CONNECTION CHECK SIGNAL IN DIRECTION FROM SERVER TO ROUTER (ONE-WAY SIGNAL) |
| T3 | 4 | AC-TNR1A.2 | COLLECTION OF ALERT FOR ABNORMALITY IN TRANSMITTING UNIT OF TRANSCEIVER R1A IN ROUTER |
| T4 | 2 | AC-LNS1.1 | GENERATION OF CONNECTION CHECK SIGNAL BETWEEN SERVER AND ROUTER (TWO-WAY SIGNAL) |
| T4 | 3 | AC-LNS1.3 | GENERATION OF CONNECTION CHECK SIGNAL IN DIRECTION FROM ROUTER TO SERVER (ONE-WAY SIGNAL) |
| T4 | 4 | AC-TNR1A.1 | COLLECTION OF ALERT FOR ABNORMALITY IN RECEIVING UNIT OF TRANSCEIVER R1A IN ROUTER |
| T5 | 2 | AC-LNS2.1 | GENERATION OF CONNECTION CHECK SIGNAL BETWEEN ROUTER AND CLIENT 1 (TWO-WAY SIGNAL) |
| T5 | 3 | AC-LNS2.2 | GENERATION OF CONNECTION CHECK SIGNAL IN DIRECTION FROM ROUTER TO CLIENT 1 (ONE-WAY SIGNAL) |
| T5 | 4 | AC-TNR1Z.2 | COLLECTION OF ALERT FOR ABNORMALITY IN TRANSMITTING UNIT OF TRANSCEIVER R1Z IN ROUTER |
| T6 | 2 | AC-LNS2.1 | GENERATION OF CONNECTION CHECK SIGNAL BETWEEN ROUTER AND CLIENT 1 (TWO-WAY SIGNAL) |
| T6 | 3 | AC-LNS2.3 | GENERATION OF CONNECTION CHECK SIGNAL IN DIRECTION FROM CLIENT 1 TO ROUTER (ONE-WAY SIGNAL) |
| T6 | 4 | AC-TNR1Z.1 | COLLECTION OF ALERT FOR ABNORMALITY IN RECEIVING UNIT OF TRANSCEIVER R1Z IN ROUTER |
| T7 | 2 | AC-LNS3.1 | GENERATION OF CONNECTION CHECK SIGNAL BETWEEN ROUTER AND CLIENT 2 (TWO-WAY SIGNAL) |
| T7 | 3 | AC-LNS3.2 | GENERATION OF CONNECTION CHECK SIGNAL IN DIRECTION FROM ROUTER TO CLIENT 2 (ONE-WAY SIGNAL) |
| T7 | 4 | AC-TNR2Z.2 | COLLECTION OF ALERT FOR ABNORMALITY IN TRANSMITTING UNIT OF TRANSCEIVER R2Z IN ROUTER |
| T8 | 2 | AC-LNS3.1 | GENERATION OF CONNECTION CHECK SIGNAL BETWEEN ROUTER AND CLIENT 2 (TWO-WAY SIGNAL) |
| T8 | 3 | AC-LNS3.3 | GENERATION OF CONNECTION CHECK SIGNAL IN DIRECTION FROM CLIENT 2 TO ROUTER (ONE-WAY SIGNAL) |
| T8 | 4 | AC-TNR2Z.1 | COLLECTION OF ALERT FOR ABNORMALITY IN RECEIVING UNIT OF TRANSCEIVER R2Z IN ROUTER |
| T9 | 2 | AC-LNS2.1 | GENERATION OF CONNECTION CHECK SIGNAL BETWEEN ROUTER AND CLIENT 1 (TWO-WAY SIGNAL) |
| T9 | 3 | AC-LNS2.3 | GENERATION OF CONNECTION CHECK SIGNAL IN DIRECTION FROM CLIENT 1 TO ROUTER (ONE-WAY SIGNAL) |
| T9 | 4 | AC-TNC1.2 | COLLECTION OF ALERT FOR ABNORMALITY IN TRANSMITTING UNIT OF TRANSCEIVER C1 IN CLIENT 1 |

Fig. 10

| ADDITIONAL ACTION NUMBER | CONTENT OF ADDITIONAL ACTION | EXAMPLE OF EXECUTION METHOD |
|---|---|---|
| AC-LNS1.1 | GENERATION OF CONNECTION CHECK SIGNAL BETWEEN SERVER AND ROUTER (TWO-WAY SIGNAL) | PING IS GENERATED FROM SERVER AND ARRIVAL OF PING IN SERVER IS MONITORED. |
| AC-LNS1.2 | GENERATION OF CONNECTION CHECK SIGNAL IN DIRECTION FROM SERVER TO ROUTER (ONE-WAY SIGNAL) | PING IS GENERATED FROM SERVER AND ARRIVAL OF PING IN ROUTER IS MONITORED. |
| AC-LNS1.3 | GENERATION OF CONNECTION CHECK SIGNAL IN DIRECTION FROM ROUTER TO SERVER (ONE-WAY SIGNAL) | PING IS GENERATED FROM ROUTER AND ARRIVAL OF PING IN SERVER IS MONITORED. |
| AC-LNS2.1 | GENERATION OF CONNECTION CHECK SIGNAL BETWEEN ROUTER AND CLIENT 1 (TWO-WAY SIGNAL) | PING IS GENERATED FROM ROUTER AND ARRIVAL OF PING IN CLIENT 1 IS MONITORED. |
| AC-LNS2.2 | GENERATION OF CONNECTION CHECK SIGNAL IN DIRECTION FROM ROUTER TO CLIENT 1 (ONE-WAY SIGNAL) | PING IS GENERATED FROM ROUTER AND ARRIVAL OF PING IN CLIENT 1 IS MONITORED. |
| AC-LNS2.3 | GENERATION OF CONNECTION CHECK SIGNAL IN DIRECTION FROM CLIENT 1 TO ROUTER (ONE-WAY SIGNAL) | PING IS GENERATED FROM CLIENT 1 AND ARRIVAL OF PING IN ROUTER IS MONITORED. |
| AC-LNS3.1 | GENERATION OF CONNECTION CHECK SIGNAL BETWEEN ROUTER AND CLIENT 2 (TWO-WAY SIGNAL) | PING IS GENERATED FROM ROUTER AND ARRIVAL OF PING IN CLIENT 2 IS MONITORED. |
| AC-LNS3.2 | GENERATION OF CONNECTION CHECK SIGNAL IN DIRECTION FROM ROUTER TO CLIENT 2 (ONE-WAY SIGNAL) | PING IS GENERATED FROM ROUTER AND ARRIVAL OF PING IN CLIENT 2 IS MONITORED. |
| AC-LNS3.3 | GENERATION OF CONNECTION CHECK SIGNAL IN DIRECTION FROM CLIENT 2 TO ROUTER (ONE-WAY SIGNAL) | PING IS GENERATED FROM CLIENT 2 AND ARRIVAL OF PING IN ROUTER IS MONITORED. |
| AC-TNC1.1 | COLLECTION OF ALERT FOR ABNORMALITY IN RECEIVING UNIT OF TRANSCEIVER C1 IN CLIENT 1 | MONITORING SERVER COLLECTS INFORMATION FROM CLIENT 1 THROUGH Telnet, USING REMOTE OPERATION. IT IS CHECKED WHETHER THERE IS ALERT FOR ABNORMALITY IN RECEIVING UNIT OF TRANSCEIVER C1. |
| AC-TNC1.2 | COLLECTION OF ALERT FOR ABNORMALITY IN TRANSMITTING UNIT OF TRANSCEIVER C1 IN CLIENT 1 | MONITORING SERVER COLLECTS INFORMATION FROM CLIENT 1 THROUGH Telnet, USING REMOTE OPERATION. IT IS CHECKED WHETHER THERE IS ALERT FOR ABNORMALITY IN TRANSMITTING UNIT OF TRANSCEIVER C1. |
| AC-TNC2.1 | COLLECTION OF ALERT FOR ABNORMALITY IN RECEIVING UNIT OF TRANSCEIVER C2 IN CLIENT 2 | MONITORING SERVER COLLECTS INFORMATION FROM CLIENT 2 THROUGH Telnet, USING REMOTE OPERATION. IT IS CHECKED WHETHER THERE IS ALERT FOR ABNORMALITY IN RECEIVING UNIT OF TRANSCEIVER C2. |
| AC-TNC2.2 | COLLECTION OF ALERT FOR ABNORMALITY IN TRANSMITTING UNIT OF TRANSCEIVER C2 IN CLIENT 2 | MONITORING SERVER COLLECTS INFORMATION FROM CLIENT 2 THROUGH Telnet, USING REMOTE OPERATION. IT IS CHECKED WHETHER THERE IS ALERT FOR ABNORMALITY IN TRANSMITTING UNIT OF TRANSCEIVER C2. |
| AC-TNR1A.1 | COLLECTION OF ALERT FOR ABNORMALITY IN RECEIVING UNIT OF TRANSCEIVER R1A IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN RECEIVING UNIT OF TRANSCEIVER R1A. |
| AC-TNR1A.2 | COLLECTION OF ALERT FOR ABNORMALITY IN TRANSMITTING UNIT OF TRANSCEIVER R1A IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN TRANSMITTING UNIT OF TRANSCEIVER R1A. |
| AC-TNR1Z.1 | COLLECTION OF ALERT FOR ABNORMALITY IN RECEIVING UNIT OF TRANSCEIVER R1Z IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN RECEIVING UNIT OF TRANSCEIVER R1Z. |
| AC-TNR1Z.2 | COLLECTION OF ALERT FOR ABNORMALITY IN TRANSMITTING UNIT OF TRANSCEIVER R1Z IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN TRANSMITTING UNIT OF TRANSCEIVER R1Z. |
| AC-TNR2Z.1 | COLLECTION OF ALERT FOR ABNORMALITY IN RECEIVING UNIT OF TRANSCEIVER R2Z IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN RECEIVING UNIT OF TRANSCEIVER R2Z. |
| AC-TNR2Z.2 | COLLECTION OF ALERT FOR ABNORMALITY IN TRANSMITTING UNIT OF TRANSCEIVER R2Z IN ROUTER | MONITORING SERVER COLLECTS INFORMATION FROM ROUTER THROUGH Telnet, USING REMOTE OPERATION. IT IS CHECKED WHETHER THERE IS ALERT FOR ABNORMALITY IN TRANSMITTING UNIT OF TRANSCEIVER R2Z. |
| AC-TNS1.1 | COLLECTION OF ALERT FOR ABNORMALITY IN RECEIVING UNIT OF TRANSCEIVER S1 IN SERVER | MONITORING SERVER COLLECTS INFORMATION FROM SERVER THROUGH Telnet, USING REMOTE OPERATION. IT IS CHECKED WHETHER THERE IS ALERT FOR ABNORMALITY IN RECEIVING UNIT OF TRANSCEIVER S1. |
| AC-TNS1.2 | COLLECTION OF ALERT FOR ABNORMALITY IN TRANSMITTING UNIT OF TRANSCEIVER S1 IN SERVER | MONITORING SERVER COLLECTS INFORMATION FROM SERVER THROUGH Telnet, USING REMOTE OPERATION. IT IS CHECKED WHETHER THERE IS ALERT FOR ABNORMALITY IN TRANSMITTING UNIT OF TRANSCEIVER S1. |

Fig. 11A

| ADDITIONAL ACTION NUMBER | CONTENT OF ADDITIONAL ACTION | FAILURE EVENT NUMBER AS RESULT OF ACTION | CONTENT OF FAILURE EVENT AS RESULT OF ACTION ※FAILURE EVENT INCLUDES RESULT INDICATING THAT THERE IS NO FAILURE |
|---|---|---|---|
| AC-LNS1.1 | GENERATION OF CONNECTION CHECK SIGNAL BETWEEN SERVER AND ROUTER (TWO-WAY SIGNAL) | EV–LNS1.1 | SIGNAL INTERRUPTION BETWEEN SERVER AND ROUTER (TWO-WAY SIGNAL) |
|  |  | EV–LNS1.1p | SIGNAL CONTINUITY BETWEEN SERVER AND ROUTER (TWO-WAY SIGNAL) |
| AC-LNS1.2 | GENERATION OF CONNECTION CHECK SIGNAL IN DIRECTION FROM SERVER TO ROUTER (ONE-WAY SIGNAL) | EV–LNS1.2 | SIGNAL INTERRUPTION IN DIRECTION FROM SERVER TO ROUTER (ONE-WAY SIGNAL) |
|  |  | EV–LNS1.2p | SIGNAL CONTINUITY IN DIRECTION FROM SERVER TO ROUTER (ONE-WAY SIGNAL) |
| AC-LNS1.3 | GENERATION OF CONNECTION CHECK SIGNAL IN DIRECTION FROM ROUTER TO SERVER (ONE-WAY SIGNAL) | EV–LNS1.3 | SIGNAL INTERRUPTION IN DIRECTION FROM ROUTER TO SERVER (ONE-WAY SIGNAL) |
|  |  | EV–LNS1.3p | SIGNAL CONTINUITY IN DIRECTION FROM ROUTER TO SERVER (ONE-WAY SIGNAL) |
| AC-LNS2.1 | GENERATION OF CONNECTION CHECK SIGNAL BETWEEN ROUTER AND CLIENT 1 (TWO-WAY SIGNAL) | EV–LNS2.1 | SIGNAL INTERRUPTION BETWEEN ROUTER AND CLIENT 1 (TWO-WAY SIGNAL) |
|  |  | EV–LNS2.1p | SIGNAL CONTINUITY BETWEEN ROUTER AND CLIENT 1 (TWO-WAY SIGNAL) |
| AC-LNS2.2 | GENERATION OF CONNECTION CHECK SIGNAL IN DIRECTION FROM ROUTER TO CLIENT 1 (ONE-WAY SIGNAL) | EV–LNS2.2 | SIGNAL INTERRUPTION IN DIRECTION FROM ROUTER TO CLIENT 1 (ONE-WAY SIGNAL) |
|  |  | EV–LNS2.2p | SIGNAL CONTINUITY IN DIRECTION FROM ROUTER TO CLIENT 1 (ONE-WAY SIGNAL) |
| AC-LNS2.3 | GENERATION OF CONNECTION CHECK SIGNAL IN DIRECTION FROM CLIENT 1 TO ROUTER (ONE-WAY SIGNAL) | EV–LNS2.3 | SIGNAL INTERRUPTION IN DIRECTION FROM CLIENT 1 TO ROUTER (ONE-WAY SIGNAL) |
|  |  | EV–LNS2.3p | SIGNAL CONTINUITY IN DIRECTION FROM CLIENT 1 TO ROUTER (ONE-WAY SIGNAL) |
| AC-LNS3.1 | GENERATION OF CONNECTION CHECK SIGNAL BETWEEN ROUTER AND CLIENT 2 (TWO-WAY SIGNAL) | EV–LNS3.1 | SIGNAL INTERRUPTION BETWEEN ROUTER AND CLIENT 2 (TWO-WAY SIGNAL) |
|  |  | EV–LNS3.1p | SIGNAL CONTINUITY BETWEEN ROUTER AND CLIENT 2 (TWO-WAY SIGNAL) |
| AC-LNS3.2 | GENERATION OF CONNECTION CHECK SIGNAL IN DIRECTION FROM ROUTER TO CLIENT 2 (ONE-WAY SIGNAL) | EV–LNS3.2 | SIGNAL INTERRUPTION IN DIRECTION FROM ROUTER TO CLIENT 2 (ONE-WAY SIGNAL) |
|  |  | EV–LNS3.2p | SIGNAL CONTINUITY IN DIRECTION FROM ROUTER TO CLIENT 2 (ONE-WAY SIGNAL) |
| AC-LNS3.3 | GENERATION OF CONNECTION CHECK SIGNAL IN DIRECTION FROM CLIENT 2 TO ROUTER (ONE-WAY SIGNAL) | EV–LNS3.3 | SIGNAL INTERRUPTION IN DIRECTION FROM CLIENT 2 TO ROUTER (ONE-WAY SIGNAL) |
|  |  | EV–LNS3.3p | SIGNAL CONTINUITY IN DIRECTION FROM CLIENT 2 TO ROUTER (ONE-WAY SIGNAL) |

Fig. 11B

| | 902 | | 903 | 1101 / 1102 |
|---|---|---|---|---|
| AC-TNC1.1 | COLLECTION OF ALERT FOR ABNORMALITY IN RECEIVING UNIT OF TRANSCEIVER C1 IN CLIENT 1 | EV-TNC1.1 | ALERT FOR ABNORMALITY IN RECEIVING UNIT OF TRANSCEIVER C1 IN CLIENT 1 |
| | | EV-TNC1.1p | NO ALERT FOR ABNORMALITY IN RECEIVING UNIT OF TRANSCEIVER C1 IN CLIENT 1 |
| AC-TNC1.2 | COLLECTION OF ALERT FOR ABNORMALITY IN TRANSMITTING UNIT OF TRANSCEIVER C1 IN CLIENT 1 | EV-TNC1.2 | ALERT FOR ABNORMALITY IN TRANSMITTING UNIT OF TRANSCEIVER C1 IN CLIENT 1 |
| | | EV-TNC1.2p | NO ALERT FOR ABNORMALITY IN TRANSMITTING UNIT OF TRANSCEIVER C1 IN CLIENT 1 |
| AC-TNC2.1 | COLLECTION OF ALERT FOR ABNORMALITY IN RECEIVING UNIT OF TRANSCEIVER C2 IN CLIENT 2 | EV-TNC2.1 | ALERT FOR ABNORMALITY IN RECEIVING UNIT OF TRANSCEIVER C2 IN CLIENT 2 |
| | | EV-TNC2.1p | NO ALERT FOR ABNORMALITY IN RECEIVING UNIT OF TRANSCEIVER C2 IN CLIENT 2 |
| AC-TNC2.2 | COLLECTION OF ALERT FOR ABNORMALITY IN TRANSMITTING UNIT OF TRANSCEIVER C2 IN CLIENT 2 | EV-TNC2.2 | ALERT FOR ABNORMALITY IN TRANSMITTING UNIT OF TRANSCEIVER C2 IN CLIENT 2 |
| | | EV-TNC2.2p | NO ALERT FOR ABNORMALITY IN TRANSMITTING UNIT OF TRANSCEIVER C2 IN CLIENT 2 |
| AC-TNR1A.1 | COLLECTION OF ALERT FOR ABNORMALITY IN RECEIVING UNIT OF TRANSCEIVER R1A IN ROUTER | EV-TNR1A.1 | ALERT FOR ABNORMALITY IN RECEIVING UNIT OF TRANSCEIVER R1A IN ROUTER |
| | | EV-TNR1A.1p | NO ALERT FOR ABNORMALITY IN RECEIVING UNIT OF TRANSCEIVER R1A IN ROUTER |
| AC-TNR1A.2 | COLLECTION OF ALERT FOR ABNORMALITY IN TRANSMITTING UNIT OF TRANSCEIVER R1A IN ROUTER | EV-TNR1A.2 | ALERT FOR ABNORMALITY IN TRANSMITTING UNIT OF TRANSCEIVER R1A IN ROUTER |
| | | EV-TNR1A.2p | NO ALERT FOR ABNORMALITY IN TRANSMITTING UNIT OF TRANSCEIVER R1A IN ROUTER |
| AC-TNR1Z.1 | COLLECTION OF ALERT FOR ABNORMALITY IN RECEIVING UNIT OF TRANSCEIVER R1Z IN ROUTER | EV-TNR1Z.1 | ALERT FOR ABNORMALITY IN RECEIVING UNIT OF TRANSCEIVER R1Z IN ROUTER |
| | | EV-TNR1Z.1p | NO ALERT FOR ABNORMALITY IN RECEIVING UNIT OF TRANSCEIVER R1Z IN ROUTER |
| AC-TNR1Z.2 | COLLECTION OF ALERT FOR ABNORMALITY IN TRANSMITTING UNIT OF TRANSCEIVER R1Z IN ROUTER | EV-TNR1Z.2 | ALERT FOR ABNORMALITY IN TRANSMITTING UNIT OF TRANSCEIVER R1Z IN ROUTER |
| | | EV-TNR1Z.2p | NO ALERT FOR ABNORMALITY IN TRANSMITTING UNIT OF TRANSCEIVER R1Z IN ROUTER |
| AC-TNR2Z.1 | COLLECTION OF ALERT FOR ABNORMALITY IN RECEIVING UNIT OF TRANSCEIVER R2Z IN ROUTER | EV-TNR2Z.1 | ALERT FOR ABNORMALITY IN RECEIVING UNIT OF TRANSCEIVER R2Z IN ROUTER |
| | | EV-TNR2Z.1p | NO ALERT FOR ABNORMALITY IN RECEIVING UNIT OF TRANSCEIVER R2Z IN ROUTER |
| AC-TNR2Z.2 | COLLECTION OF ALERT FOR ABNORMALITY IN TRANSMITTING UNIT OF TRANSCEIVER R2Z IN ROUTER | EV-TNR2Z.2 | ALERT FOR ABNORMALITY IN TRANSMITTING UNIT OF TRANSCEIVER R2Z IN ROUTER |
| | | EV-TNR2Z.2p | NO ALERT FOR ABNORMALITY IN TRANSMITTING UNIT OF TRANSCEIVER R2Z IN ROUTER |
| AC-TNS1.1 | COLLECTION OF ALERT FOR ABNORMALITY IN RECEIVING UNIT OF TRANSCEIVER S1 IN SERVER | EV-TNS1.1 | ALERT FOR ABNORMALITY IN RECEIVING UNIT OF TRANSCEIVER S1 IN SERVER |
| | | EV-TNS1.1p | NO ALERT FOR ABNORMALITY IN RECEIVING UNIT OF TRANSCEIVER S1 IN SERVER |
| AC-TNS1.2 | COLLECTION OF ALERT FOR ABNORMALITY IN TRANSMITTING UNIT OF TRANSCEIVER S1 IN SERVER | EV-TNS1.2 | ALERT FOR ABNORMALITY IN TRANSMITTING UNIT OF TRANSCEIVER S1 IN SERVER |
| | | EV-TNS1.2p | NO ALERT FOR ABNORMALITY IN TRANSMITTING UNIT OF TRANSCEIVER S1 IN SERVER |

Fig. 19

| From | To | RELATION ID | HIGH-LEVEL LINK | DIRECTION | PHYSICAL PORT ON PATH | CONNECTION CHECK METHOD |
|---|---|---|---|---|---|---|
| SRV-1 | CL1-1 | LNP1.1 | NOTHING | TWO WAYS | LOW-LEVEL LINK IS PRESENT | PING IS GENERATED FROM SERVER AND ARRIVAL OF PING IN SERVER IS MONITORED. |
| SRV-1 | CL1-1 | LNP1.2 | NOTHING | ONE WAY | LOW-LEVEL LINK IS PRESENT | PING IS GENERATED FROM SERVER AND ARRIVAL OF PING IN CLI-1 IS MONITORED. |
| CL1-1 | SRV-1 | LNP1.3 | NOTHING | ONE WAY | LOW-LEVEL LINK IS PRESENT | PING IS GENERATED FROM CLI-1 AND ARRIVAL OF PING IN SERVER IS MONITORED. |
| SRV-1 | CL2-1 | LNP2.1 | NOTHING | TWO WAYS | LOW-LEVEL LINK IS PRESENT | (THE REST IS OMITTED) |
| SRV-1 | CL2-1 | LNP2.2 | NOTHING | ONE WAY | LOW-LEVEL LINK IS PRESENT | |
| CL2-1 | SRV-1 | LNP2.3 | NOTHING | ONE WAY | LOW-LEVEL LINK IS PRESENT | |
| SRV-1 | RTR-1 | LNP1.1, LNP2.1 | LNP1.1 | TWO WAYS | TNS1, TNR1A | |
| SRV-1 | RTR-1 | LNP1.2, LNP2.2 | LNP1.2 | ONE WAY | TNS1.2, TNR1A.1 | |
| RTR-1 | SRV-1 | LNP1.3, LNP2.3 | LNP1.3 | ONE WAY | TNS1.1, TNR1A.2 | |
| RTR-1 | CL1-1 | LNP1.1 | LNP1.1 | TWO WAYS | TNR1Z, TNC1 | |
| RTR-1 | CL1-1 | LNP1.2 | LNP1.2 | ONE WAY | TNR1Z.2, TNC1.1 | |
| CL1-1 | RTR-1 | LNP1.3 | LNP1.3 | ONE WAY | TNR1Z.1, TNC1.2 | |
| RTR-1 | CL2-1 | LNP2.1 | LNP1.1 | TWO WAYS | TNR2Z, TNC2 | |
| RTR-1 | CL2-1 | LNP2.2 | LNP1.2 | ONE WAY | TNR2Z.2, TNC2.1 | |
| CL2-1 | RTR-1 | LNP2.3 | LNP1.3 | ONE WAY | TNR2Z.1, TNC2.2 | |

Fig. 21

(f) ADDED CLIENT 3

| CONTENT | ITEM |
|---|---|
| ID | CLT3 |
| IP ADDRESS | CL3-1(XXX.XXX.XXX.XXX) |
| MOUNTED TRANSCEIVER | TNC3 |
| REMOTE LOGIN METHOD | ID=XX, PASSWORD=XX |

(d) ROUTER  1500

| CONTENT | ITEM |
|---|---|
| ID | RTR |
| IP ADDRESS | RTR-1(XXX.XXX.XXX.XXX) |
| MOUNTED TRANSCEIVER | TNR1A, TNR1Z, TNR2Z, TNR3Z |
| REMOTE LOGIN METHOD | ID=XX, PASSWORD=XX |

(e) ADDED TRANSCEIVER

| CONTENT | ITEM |
|---|---|
| ID | TNR3Z(RECEIVING UNIT TNRZ3.1, TRANSMITTING UNIT TNR3Z.2) |
| DIRECTION TYPE | TWO-CORE TYPE (TRANSMISSION AND RECEPTION ARE SEPARATED) |
| FAILURE INFORMATION STORAGE AREA | RECEIVING UNIT FAILURE STORAGE AREA:XXX TRANSMITTING UNIT FAILURE STORAGE AREA:XXX |

| CONTENT | ITEM |
|---|---|
| ID | TNC3(RECEIVING UNIT TNC3.1, TRANSMITTING UNIT TNC3.2) |
| DIRECTION TYPE | TWO-CORE TYPE (TRANSMISSION AND RECEPTION ARE SEPARATED) |
| FAILURE INFORMATION STORAGE AREA | RECEIVING UNIT FAILURE STORAGE AREA:XXX TRANSMITTING UNIT FAILURE STORAGE AREA:XXX |

Fig. 22

| From | To | RELATION ID | HIGH-LEVEL LINK | DIRECTION | PHYSICAL PORT ON PATH | CONNECTION CHECK METHOD |
|---|---|---|---|---|---|---|
| SRV-1 | CL1-1 | LNP1.1 | NOTHING | TWO WAYS | LOW-LEVEL LINK IS PRESENT | |
| SRV-1 | CL1-1 | LNP1.2 | NOTHING | ONE WAY | LOW-LEVEL LINK IS PRESENT | |
| CL1-1 | SRV-1 | LNP1.3 | NOTHING | ONE WAY | LOW-LEVEL LINK IS PRESENT | |
| SRV-1 | CL2-1 | LNP2.1 | NOTHING | TWO WAYS | LOW-LEVEL LINK IS PRESENT | |
| SRV-1 | CL2-1 | LNP2.2 | NOTHING | ONE WAY | LOW-LEVEL LINK IS PRESENT | |
| CL2-1 | SRV-1 | LNP2.3 | NOTHING | ONE WAY | LOW-LEVEL LINK IS PRESENT | |
| SRV-1 | RTR-1 | LNS1.1 | LNP1.1, LNP2.1, LNP3.1 | TWO WAYS | TNS1, TNR1A | |
| SRV-1 | RTR-1 | LNS1.2 | LNP1.2, LNP2.2, LNP3.2 | ONE WAY | TNS1.2, TNR1A.1 | |
| RTR-1 | SRV-1 | LNS1.3 | LNP1.3, LNP2.3, LNP3.3 | ONE WAY | TNS1.1, TNR1A.2 | |
| RTR-1 | CL1-1 | LNS2.1 | LNP1.1 | TWO WAYS | TNR1Z, TNC1 | |
| RTR-1 | CL1-1 | LNS2.2 | LNP1.2 | ONE WAY | TNR1Z.2, TNC1.1 | |
| CL1-1 | RTR-1 | LNS2.3 | LNP1.3 | ONE WAY | TNR1Z.1, TNC1.2 | |
| RTR-1 | CL2-1 | LNS3.1 | LNP2.1 | TWO WAYS | TNR2Z, TNC2 | |
| RTR-1 | CL2-1 | LNS3.2 | LNP2.2 | ONE WAY | TNR2Z.2, TNC2.1 | |
| CL2-1 | RTR-1 | LNS3.3 | LNP2.3 | ONE WAY | TNR2Z.1, TNC2.2 | |
| SRV-1 | CL3-1 | LNP3.1 | NOTHING | TWO WAYS | LOW-LEVEL LINK IS PRESENT | |
| SRV-1 | CL3-1 | LNP3.2 | NOTHING | ONE WAY | LOW-LEVEL LINK IS PRESENT | |
| CL3-1 | SRV-1 | LNP3.3 | NOTHING | ONE WAY | LOW-LEVEL LINK IS PRESENT | |
| RTR-1 | CL3-1 | LNS4.1 | LNP3.1 | TWO WAYS | TNR3Z, TNC3 | |
| RTR-1 | CL3-1 | LNS4.2 | LNP3.2 | ONE WAY | TNR3Z.2, TNC3.1 | |
| CL3-1 | RTR-1 | LNS4.3 | LNP3.3 | ONE WAY | TNR3Z.1, TNC3.2 | |

FAILURE ISOLATION METHOD AND MANAGEMENT SERVER FOR FAILURE ISOLATION

CLAIM OF PRIORITY

The present application claims priority from Japanese patent application JP2015-196596 filed on Oct. 2, 2015, the content of which is hereby incorporated by reference into this application.

BACKGROUND OF THE INVENTION

Field of the Invention

The present invention relates to a technique for specifying a failure which occurs in a network system.

Description of the Related Art

When a failure which occurs in a network system is specified, a technique (root cause analysis: RCA) has been known which performs failure cause analysis on the basis of a rule (JP 2012-256355 A).

[Patent Document 1] JP 2012-256355 A

When a failure which occurs in a network system is specified, it is necessary to perform an operation for a specific target in the network (this operation is referred to as an "action"), to acquire an event which is generated in response to the action (referred to as "event"), to apply a predetermined rule to the acquired event, and to specify the content or position of the failure.

In RCA, the causes of a failure are isolated on condition that an event is generated. Therefore, there is a case in which an alert (an event indicating a failure) is not obtained or a case in which it is difficult to analyze the causes of a failure of which the rule is not capable of being made. Therefore, it is necessary to improve the accuracy of cause analysis.

The action is to perform an operation for a specific target, using network resources. Various types of failures occur in the network system. When actions for specifying all of the failures are performed, the amount of traffic increases and a large amount of resources is consumed.

In contrast, when an action is performed only for a limited number of targets, the amount of traffic does not increase, but it is difficult to accurately specify the content or position of a failure. In particular, in the present situation in which a cloud and a network are virtualized, services are constructed using various types of virtualized resources. As a result, when a failure occurs, it is difficult to isolate the failure.

An object of the invention is to accurately specify the content or position of a failure in a network while suppressing the consumption of resources.

SUMMARY OF THE INVENTION

According to an aspect of the invention for solving the above-mentioned problems, there is provided a failure isolation method that extracts a failure which has a possibility to occur in a monitoring target as a root cause event. The method includes: an action execution step of executing an action for designating a predetermined operation for the monitoring target and collecting a failure event which is obtained as a result of the action; an additional action execution step of executing an additional action for designating a predetermined operation for the monitoring target on the basis of the failure event and collecting an additional failure event which is obtained as a result of the additional action; a failure cause analysis step of analyzing the additional failure event on the basis of a predetermined failure cause analysis rule and determining the root cause event and a certainty factor of the root cause event; and an analysis completion determination step of determining whether the analysis has been completed, on the basis of the root cause event and the certainty factor of the root cause event.

As a detailed example of the structure, when the certainty factor does not satisfy a predetermined requirement in the analysis completion determination step, the additional action execution step, the failure cause analysis step, and the analysis completion determination step may be performed again.

As a detailed example of the structure, the failure isolation method may further include an additional action determination step before the additional action execution step. The additional action determination step may determine an additional action to be executed from the actions at levels corresponding to the number of times the additional action execution step, the failure cause analysis step, and the analysis completion determination step are performed, among additional actions which are classified into levels and are prepared in advance on the basis of the failure event.

As a detailed example of the structure, the failure cause analysis rule may be information about a list of root cause occurrence conditions corresponding to the root cause event. In the failure cause analysis step, the root cause occurrence conditions may be extracted, using the additional failure event, with reference to a failure event-root cause occurrence condition correspondence map indicating a correspondence between the failure event and the root cause occurrence conditions. The root cause event and the certainty factor of the root cause event may be determined on the basis of the extracted root cause occurrence conditions and the failure cause analysis rule.

As a detailed example of the structure, in the additional action determination step, an additional action corresponding to the root cause event determined in the failure cause analysis step may be determined, using a root cause event number-additional action correspondence table in which the root cause event is associated with the additional action.

As a detailed example of the structure, in the analysis completion determination step, it may be determined whether the analysis has been completed on the basis of at least one of whether a difference between the certainty factors of a candidate with the highest certainty factor and a candidate with the second highest certainty factor in the root cause event determined in the failure cause analysis step satisfies a predetermined requirement and whether the certainty factor of the candidate with the highest certainty factor satisfies a predetermined requirement.

As a detailed example of the structure, in the analysis completion determination step, when a difference between the certainty factor of a candidate with the highest certainty factor and the certainty factors of other candidates in the root cause event determined in the failure cause analysis step is less than a predetermined threshold value, a candidate having a certainty factor that is less than the certainty factor of the candidate with the highest certainty factor by the predetermined threshold value may remain and the other candidates may be removed.

As a detailed example of the structure, the root cause event number-additional action correspondence table may include appearance frequency information. The appearance frequency information may include information corresponding to the appearance frequency of the root cause events which are narrowed down when it is determined in the analysis completion determination step that the analysis has been completed. In the additional action determination step, an additional action may be determined on the basis of the appearance frequency information.

As a detailed example of the structure, topology information indicating a relationship between the monitoring targets may be acquired. The failure cause analysis rule, the failure event-root cause occurrence condition correspondence map, and the root cause event number-additional action correspondence table may be added or corrected on the basis of the topology information.

According to another aspect of the invention, there is provided a failure isolation method that extracts a failure which has a possibility to occur in a monitoring target as a root cause event. The failure isolation method includes: a first step of performing a predetermined action for the monitoring target, collecting a failure event which is a result of the action, applying the failure event to a failure cause analysis rule, and narrowing down the root cause events together with certainty factors; a second step of determining whether the root cause event and the certainty factor narrowed down in the first step satisfy a predetermined requirement and whether the narrowing-down has been completed; and a third step of, when it is determined in the second step that the narrowing-down has not been completed, performing a predetermined additional action for the monitoring target, collecting an additional failure event which is a result of the additional action, applying the additional failure event to the failure cause analysis rule, and narrowing down the root cause events together with the certainty factors. The third step is performed as the first step, and the process returns to the second step and is continuously performed until the narrowing-down is completed.

According to still another aspect of the invention, there is provided a management server for failure isolation that extracts a failure which has a possibility to occur in a monitoring target as a root cause event. The management server for failure isolation includes: an action execution module that executes an action for designating a predetermined operation for the monitoring target and collects a failure event which is obtained as a result of the action; an additional action execution module that executes an additional action for designating a predetermined operation for the monitoring target on the basis of the failure event and collects an additional failure event which is obtained as a result of the additional action; a failure cause analysis module that analyzes the additional failure event on the basis of a predetermined failure cause analysis rule and determines the root cause event and a certainty factor of the root cause event; and an analysis completion determination module that determines whether the analysis has been completed, on the basis of the root cause event and the certainty factor of the root cause event.

It is possible to accurately specify the content or position of a failure in a network while suppressing the consumption of resources.

BRIEF DESCRIPTION OF THE DRAWINGS

FIG. 4 is a table illustrating a root cause event list;
FIG. 5B is a table illustrating the failure cause analysis rule for the failure in the transceiver (which follows FIG. 5A);
FIG. 6A is a table illustrating a failure cause analysis rule for link disconnection;
FIG. 6B is a table illustrating the failure cause analysis rule for link disconnection (which follows FIG. 6A);
FIG. 7 is a table illustrating an example of a list of failure events;
FIG. 8A is a table illustrating an example of a failure event-root cause occurrence condition correspondence map;
FIG. 8C is a table illustrating the example of the failure event-root cause occurrence condition correspondence map (which follows FIG. 8B);
FIG. 8D is a table illustrating the example of the failure event-root cause occurrence condition correspondence map (which follows FIG. 8C);
FIG. 8E is a table illustrating the example of the failure event-root cause occurrence condition correspondence map (which follows FIG. 8D);
FIG. 8F is a table illustrating the example of the failure event-root cause occurrence condition correspondence map (which follows FIG. 8E);
FIG. 8G is a table illustrating the example of the failure event-root cause occurrence condition correspondence map (which follows FIG. 8F);
FIG. 8I is a table illustrating the example of the failure event-root cause occurrence condition correspondence map (which follows FIG. 8H);
FIG. 9A is a table illustrating a root cause event number-additional action correspondence table;
FIG. 9B is a table illustrating the root cause event number-additional action correspondence table (which follows FIG. 9A);
FIG. 10 is a table illustrating a list of additional actions;
FIG. 11A is a diagram illustrating an additional action-failure event number correspondence table;
FIG. 11B is a diagram illustrating the additional action-failure event number correspondence table (which follows FIG. 11A);
FIG. 19 is a diagram illustrating an example of a link connection relationship management table;

FIG. 21 is a diagram illustrating an example of a component management table which is added or changed;

FIG. 22 is a diagram illustrating an example of a link connection relationship management table which is added or changed;

DETAILED DESCRIPTION OF THE PREFERRED EMBODIMENTS

Figure 1:
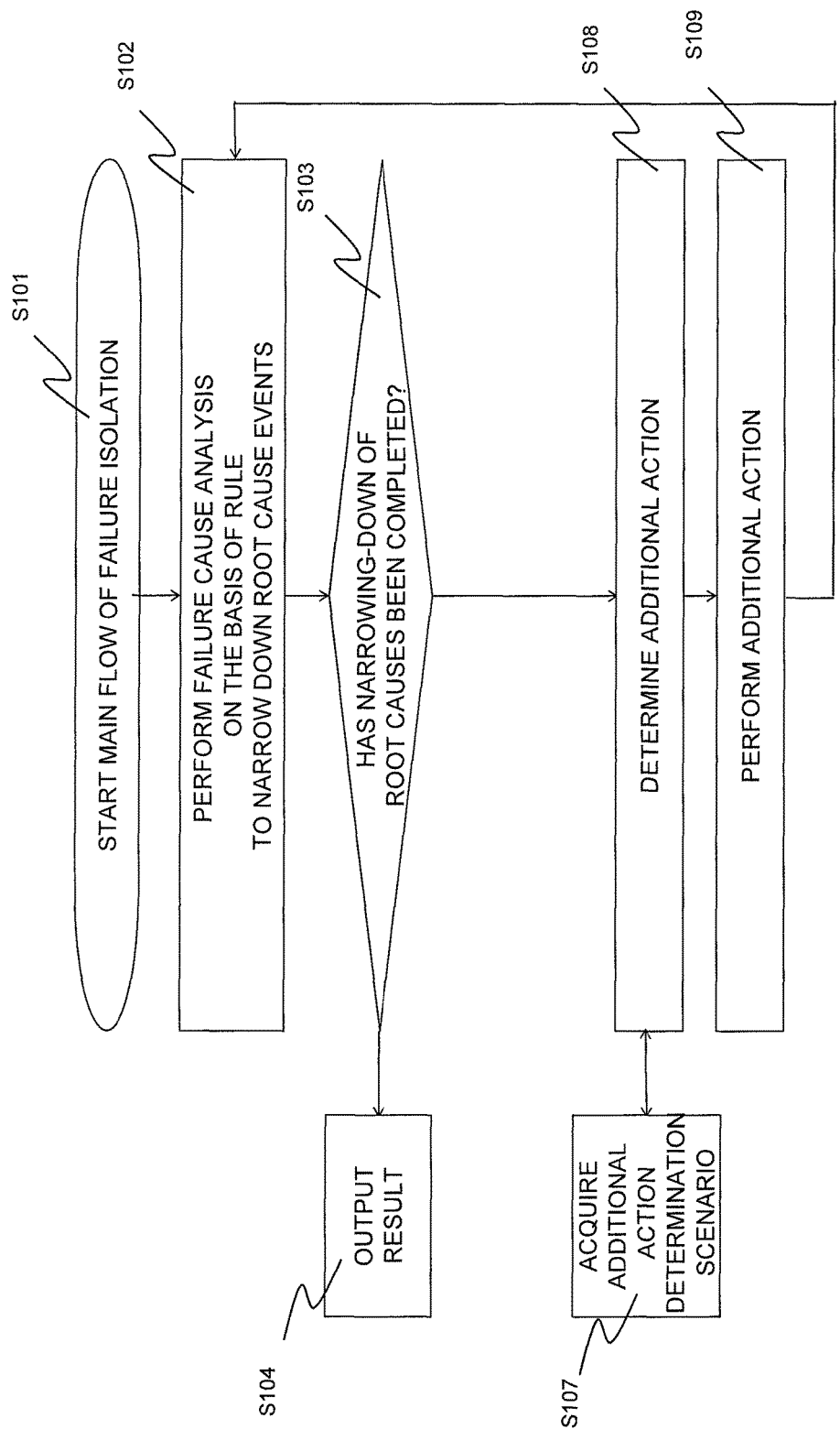
FIG. 1 is a flowchart illustrating the outline of the overall flow of Embodiment 1.

Hereinafter, embodiments will be described in detail with reference to the drawings. However, the invention is not limited to content described in the following embodiments. It will be understood by those skilled in the art that the detailed structure of the invention can be changed without departing from the scope and spirit of the invention.

In the structure of the invention which will be described below, the same components or components having the same functions are denoted by the same reference numerals in different drawings and the description thereof will not be repeated.

In the specification, for example, the terms "first", "second", and "third" are attached in order to identify components and are not necessarily limited to numbers or orders. In addition, the numbers for identifying components are used in each context. Numbers which are used in one context do not necessarily indicate the same structure in other contexts. A component identified by a certain number may have the function of a component identified another number.

In some cases, for ease of understanding of the invention, for example, the position, size, shape, and range of each component in the drawings are different from the actual position, size, shape, and range. Therefore, the invention is not necessarily limited to, for example, the position, the size, the shape, and the range illustrated in the drawings.

In the following embodiments, in the isolation of a service system in which heterogeneous virtualization environments are mixed, an example in which failure cause analysis is performed on the basis of a rule, a component in which a failure has a possibility to occur is narrowed down, and an additional action is performed using a scenario corresponding to the component will be described.

As the additional action, there are the following methods: a method which performs an isolation test; and a method which acquire additional information. The method which performs the isolation test specifies a component when a failure occurs and performs the test, using the result of failure cause analysis and a logical-physical correspondence relationship when a failure occurs, in the matching of a test scenario.

In a case in which additional information is acquired, a component during the occurrence of a failure is specified, using the analysis result of the causes of the failure and the logical-physical correspondence relationship when the failure occurs, and the additional information and a target device corresponding to the additional information are acquired.

In addition, the failure cause analysis process is performed for the results of the additional actions again. These operations are repeatedly performed. When the accuracy of the analysis result is equal to or greater than a predetermined value, the analysis result is used.

In this embodiment, as such, since a component is tested using the analysis result of the causes of a failure and a logical-physical matching table, the accuracy of inference is improved. Therefore, it is possible to effectively perform inference with high accuracy.

When a failure detection test is automatically performed, an alleged position is assumed and an action is performed. Therefore, when alerts are issued at many positions in a large-scaled environment, all of the components need to be tested, which results in a reduction in efficiency. That is, one of the tasks is to specify an alleged position. This embodiment includes a component which can respond to the task.

Embodiment 1

<Outline of Process>

FIG. 1 is a diagram illustrating the outline of the overall flow of this embodiment.

First, a failure isolation process starts. This process may be performed in response to an instruction from an operator or may be automatically performed at a predetermined time (S101). A predetermined action is performed to collect an event at the beginning, the event is applied to a rule, and root cause events are narrowed down (S102). As a narrowing-down method, for example, the following methods are used: a method which narrows down the root cause events to only top three candidates with the highest certainty factor; a method which narrows down the events to candidates with a certainty factor of 50% or more; a method which excludes candidates that have a low certainty factor and have a certainty factor difference of 30% or more therebetween from the root causes.

Then, it is determined whether the narrowing-down of the root causes has been completed (S103). The criteria are arbitrary. However, for example, it is determined that the narrowing-down of the root causes has been completed when the certainty factor of the root cause is greater than 99%. Then, the result is output and the process ends (S104).

When it is determined that the narrowing-down of the root causes has not been completed, the narrowing-down process is further performed. An additional action determination scenario is acquired in order to determine which additional action is performed for an extracted component (S107) and an additional action is determined (S108). Then, an additional action is performed to collect a corresponding event (S109).

Then, the process returns to the step (S102) and is repeatedly performed until the narrowing-down of the root causes is completed.

<Overall Structure of System>

Figure 2:
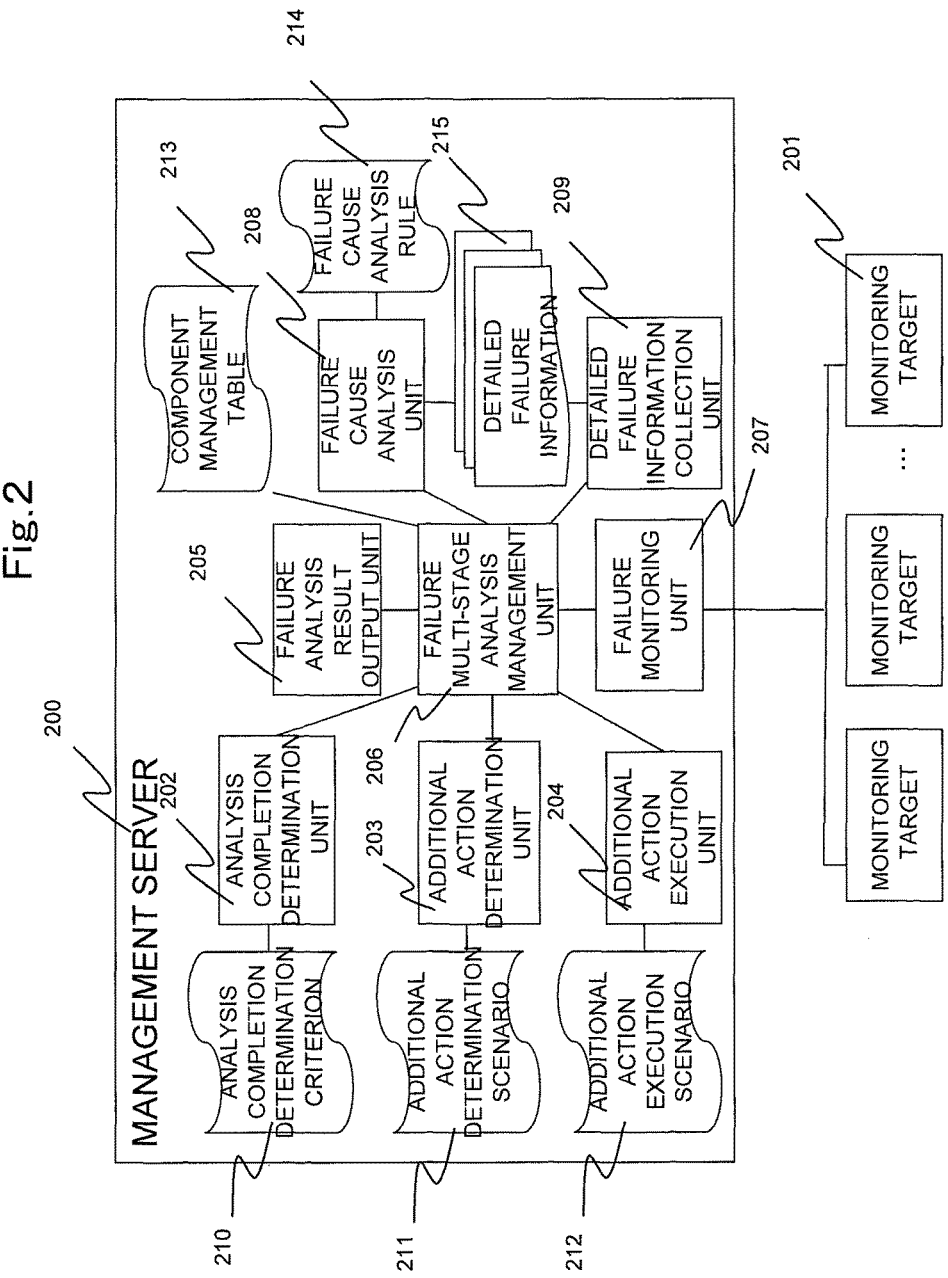
FIG. 2 is a block diagram illustrating the outline of the overall structure of a system according to Embodiment 1.

FIG. 2 is a diagram illustrating the overall structure of a system according to this embodiment. In this embodiment, a process is performed using a management server 200. A monitoring target 201 is, for example, a component (element) of a system other than a network system. As described above, the monitoring target 201 may be a physical component or a virtual component. In addition, granularity is arbitrary. For example, the granularity is units of apparatuses (for example, server apparatuses), units of boards provided in the apparatuses, or units of circuits in the boards.

The management server includes components, such as an input device, an output device, a processing device (CPU), and a storage device for a general server or the like. The management server includes an analysis completion determination unit 202, an additional action determination unit 203, an additional action execution unit 204, a failure analysis result output unit 205, a failure multi-stage analysis management unit 206, a failure monitoring unit 207, a failure cause analysis unit 208, and a detailed failure information collection unit 209, of which the content will be described in detail below.

A processor executes a program stored in a storage device to implement the functions of these units and these units can perform a predetermined process in cooperation with other hardware components. In the specification, in some cases, a program which is executed by, for example, a calculator or a means for implementing the functions thereof is referred to as a "function", a "means", a "unit", or a "module".

In addition, the management server can use information, such as an analysis completion criterion 210, an additional action determination scenario 211, an additional action execution scenario 212, a component management table 213, a failure cause analysis rule 214, and detailed failure information 215.

In the following description, in some cases, information which is used in this embodiment is expressed by a "~table", a "~list", a "~database (DB)", a "~queue", or a "table". The information may be expressed by data structures other than the table, the list, the DB, and the queue. Therefore, in some cases, the "~table", the "~list", the "~DB", and the "~queue" are referred to as "~information" in order to show that they do not depend on the data structure. The type of table exemplified in this embodiment is not necessarily one file. For example, a plurality of tables which are associated with each other by identifiers may be used. Alternatively, a plurality of tables may be integrated into one table.

When the content of each information item is described, for example, "identification information", an "identifier", a "given name", a "name", and "identification (ID)" are used and can be replaced with each other.

In the following description, in some cases, a "program" is the subject. The program is executed by the processor to perform a predetermined process while using a memory and a communication port (communication control device). Therefore, in some cases, the processor is described as the subject. The process in which the program is the subject may be a process which is performed by a calculator, such as the management server, or an information processing device. In addition, a portion of or the entire program may be implemented by dedicate hardware.

Various kinds of programs may be installed in each calculator by a program distribution server or a calculator-readable storage medium. In this case, the program distribution server includes a processor and memory resources. The memory resources store a distribution program and a program to be distributed. The processor of the program distribution server executes the distribution program to distribute the program to be distributed to other calculators.

A display, a keyboard, and a pointer device are considered as examples of the input device or the output device. However, devices other than the above-mentioned devices may be used. A serial interface or an Ethernet interface may be used as the input/output device, a calculator for display which includes a display, a keyboard, or a pointer device may be connected to the interface, and display information may be transmitted to the calculator for display or input information may be received from the calculator for display. In this way, information may be displayed by the calculator for display or input information may be received from the calculator for display, thereby replacing the input and display operations of the input/output device.

<Application Image>

Figure 3:
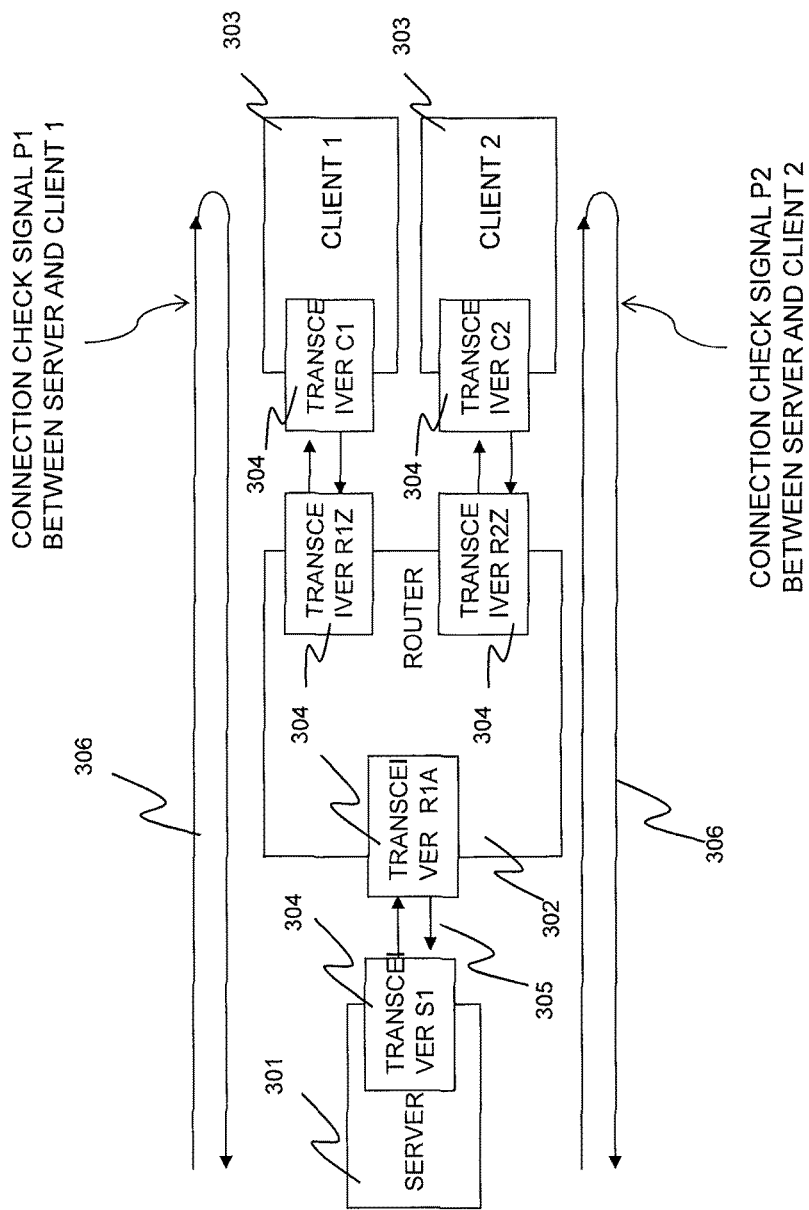
FIG. 3 is a block diagram illustrating an application example of Embodiment 1.

FIG. 3 is a diagram illustrating a detailed application example according to this embodiment. In FIG. 3, as an application example, an example will be described in which a system in which a server 301 and a plurality of clients 303 face each other and a router 302 is interposed as a relay node between the server 301 and the plurality of clients 303 is assumed and the invention is applied to the system.

It is assumed that a bidirectional line 305 (for example, a two-way optical fiber) is provided between nodes. A signal output from the line 305 is transmitted and received by transceivers 304. In this embodiment, it is assumed that communication from the server 301 to client 1 and client 2 is performed by periodically transmitting a connection check signal 306 based on, for example, an ICMP ping protocol to check connection. In addition, it is assumed that a connection signal is not periodically checked between the router 302 and the client 303. In the following description, in this embodiment, the detailed isolation of the causes of a failure is considered.

<Root Cause Event List>

FIG. 4 is a chart illustrating a root cause event list 400 in a topology in an example of the structure illustrated in FIG. 3. In the example illustrated in FIG. 3, when a communication failure is examined, a failure in the transceiver 304 and a link disconnection failure are assumed as component failures and a failure which has a possibility to occur in each component is used as a root cause event. A total of 18 types of root cause events are assumed. TXX indicates a transceiver root cause event number 401 and LXX indicates a link disconnection root cause event number 401.

<Failure Cause Analysis Rule>

Figure 5A:
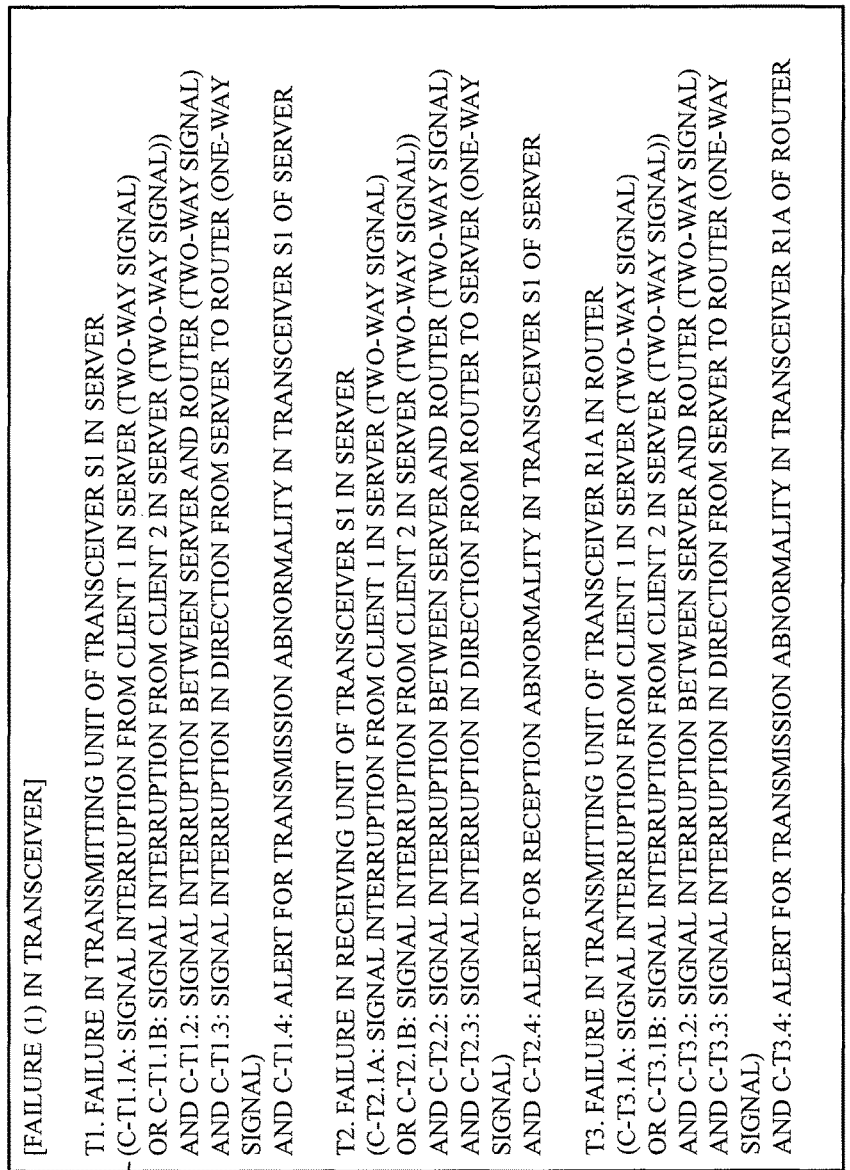
FIG. 5A is a table illustrating a failure cause analysis rule for a failure in a transceiver.
Figure 8B:
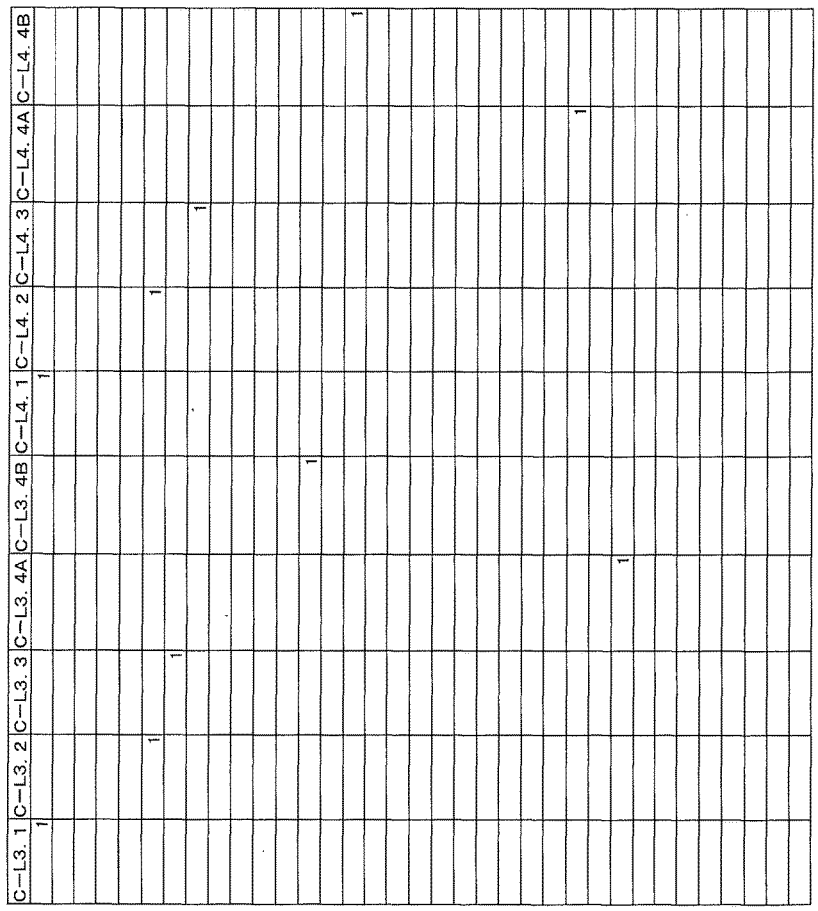
FIG. 8B is a table illustrating the example of the failure event-root cause occurrence condition correspondence map (which follows FIG. 8A)
Figure 8H:
FIG. 8H is a table illustrating the example of the failure event-root cause occurrence condition correspondence map (which follows FIG. 8G)

FIGS. 5A and 5B are charts illustrating a failure cause analysis rule 214 for a transceiver failure.

FIGS. 6A and 6B are charts illustrating a failure cause analysis rule 214 for a link disconnection failure.

This information is an example of a list of the occurrence conditions of these failures for each root cause event illustrated in FIG. 4. Each of the occurrence conditions corresponds to an occurring event. That is, when all of the conditions are established, it is ascertained that the assumed failure has occurred. In the drawings, for example, "C-T1.1A" is a root cause occurrence condition number 501. In the root cause occurrence condition number 501, "C-" indicates a rule, C-Tx.y indicates a rule for a transceiver failure Tx, and C-Lx.y indicates a rule for a link disconnection failure Lx. In addition, y indicates determination priority in each rule. Each rule includes a logical sum (OR) and a logical product (AND). The same determination priority is written in parenthesis. For example, when two items are provided, C-Tx.yA and C-Tx.B are written in parenthesis.

<Failure Event List>

FIG. 7 is a diagram illustrating an example of a failure event list table 700 which is collected by the detailed failure information collection unit 209. This information indicates a list of events which will occur. Event content 702 corresponds to a failure event number 701. The event is mainly failure information. However, an event "no abnormality alert" results from an additional action for isolation. "EV" at the head of the event number 701 indicates an event and a suffix "p" is attached to an event number without abnormality.

<Failure Event-Root Cause Occurrence Condition Correspondence Map>

Figure 8A:
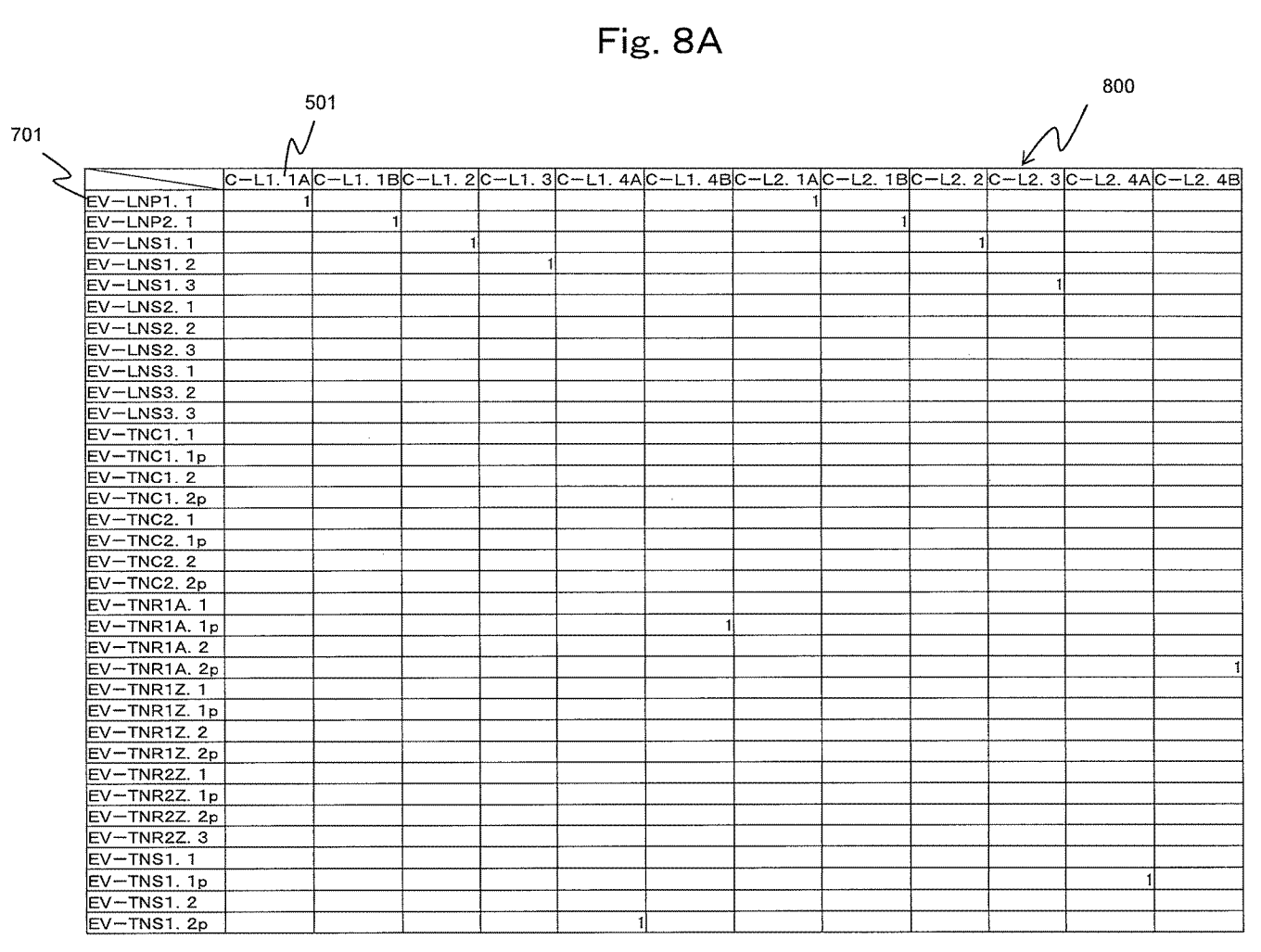
Figure 8C:
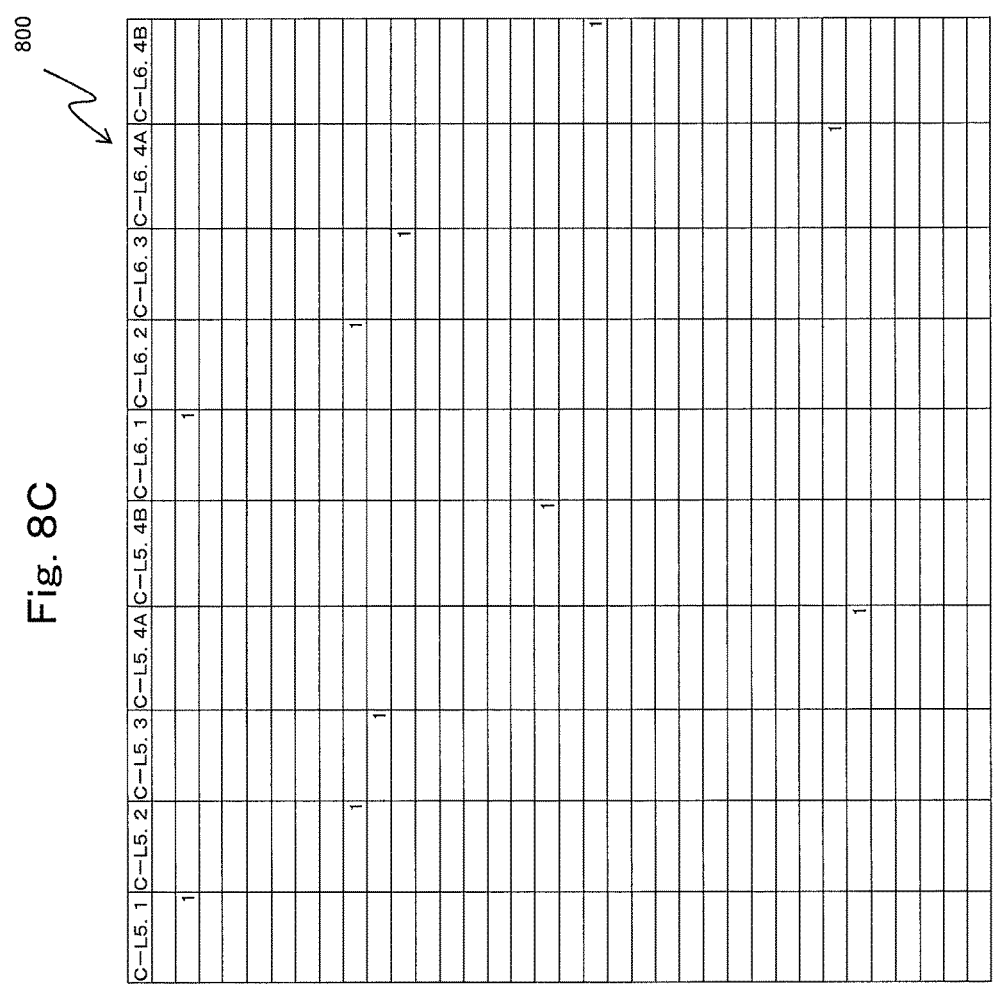
Figure 8D:
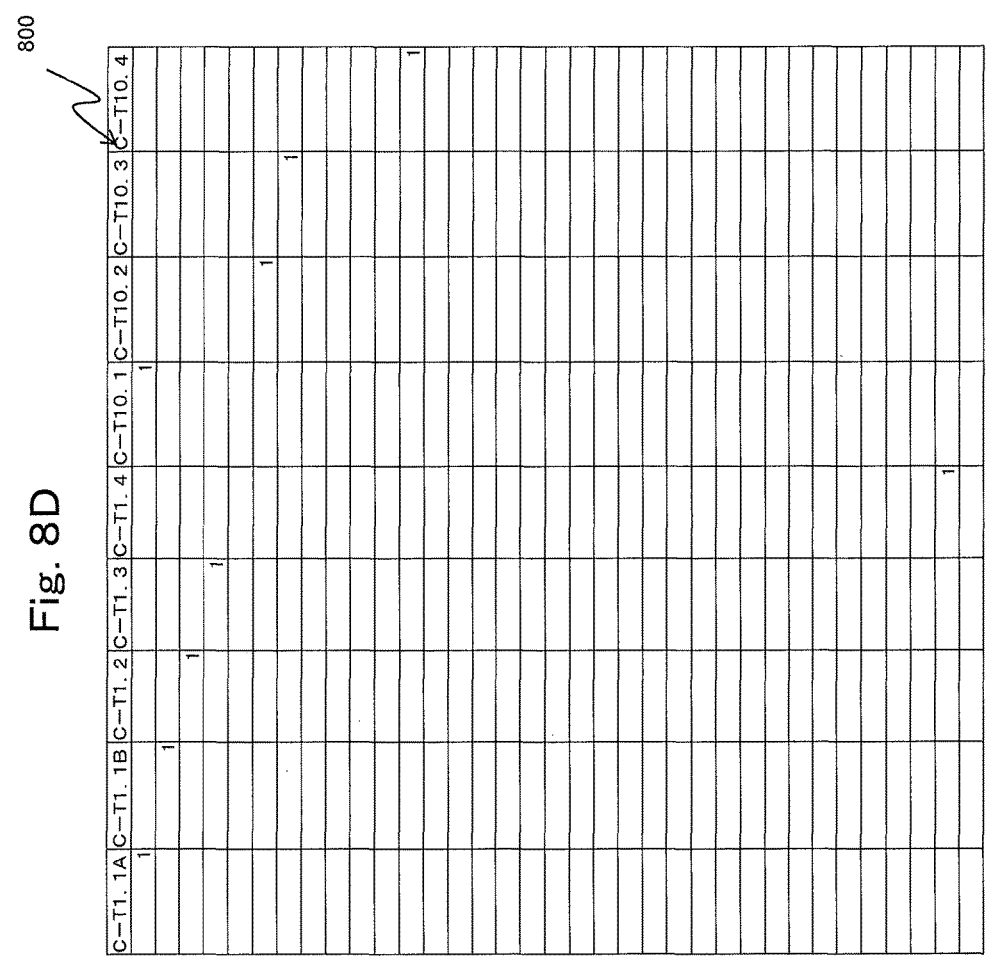
Figure 8E:
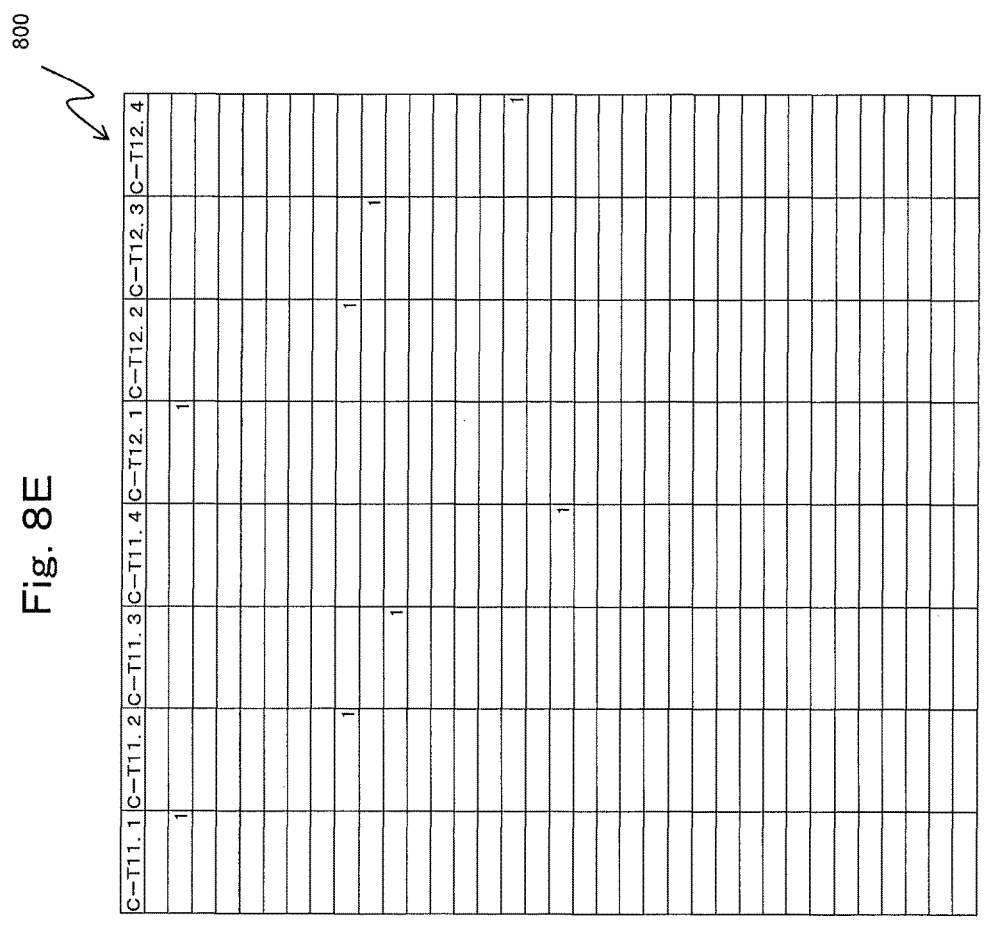
Figure 8F:
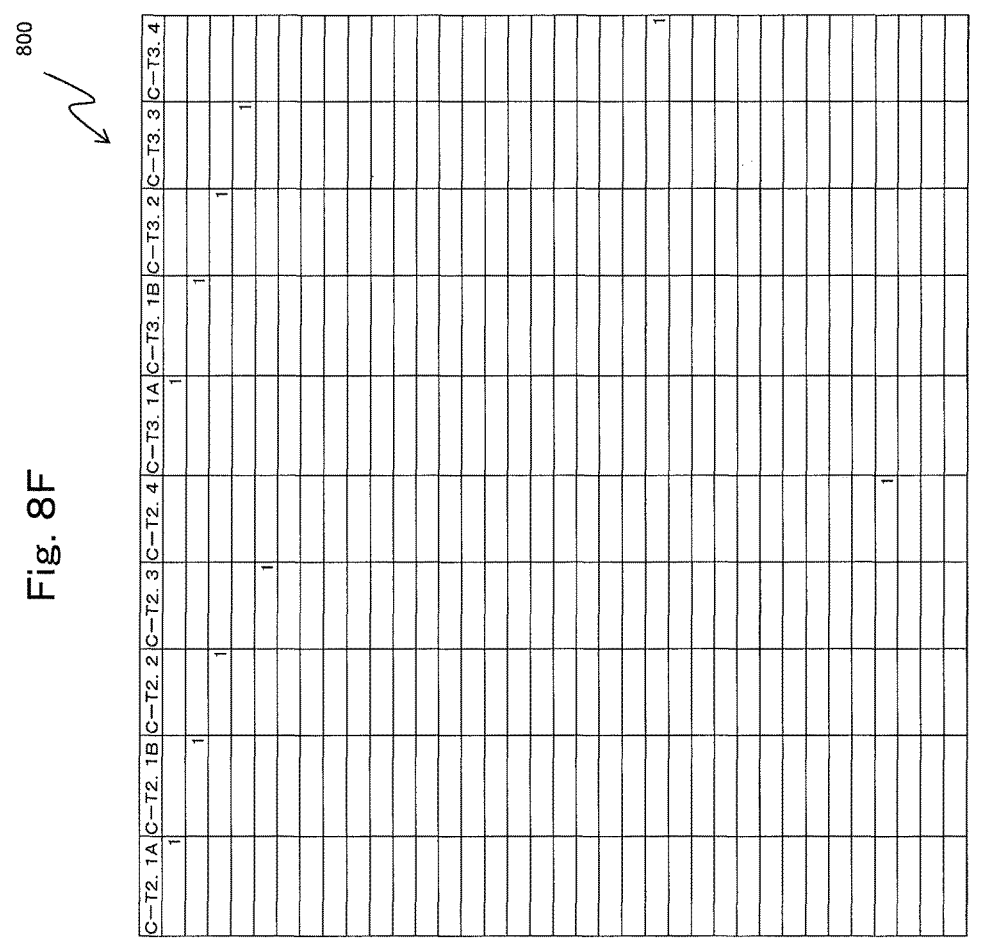
Figure 8G:
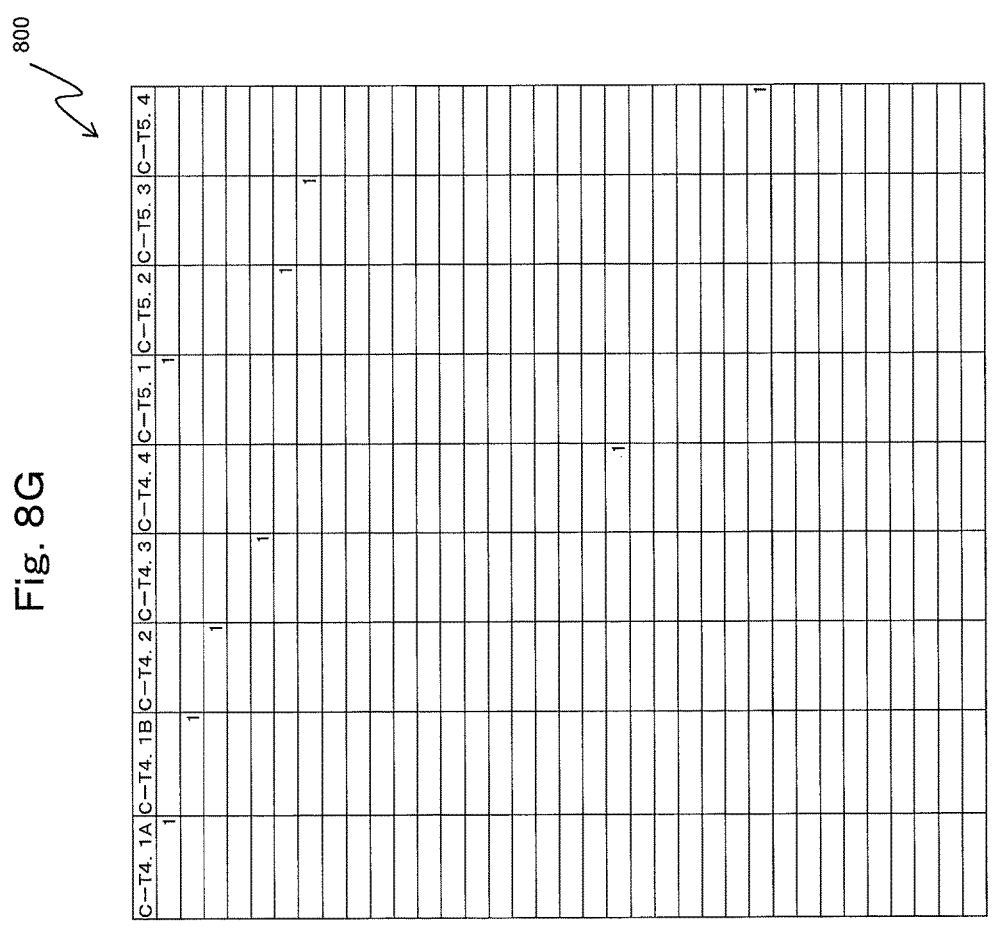
Figure 8I:
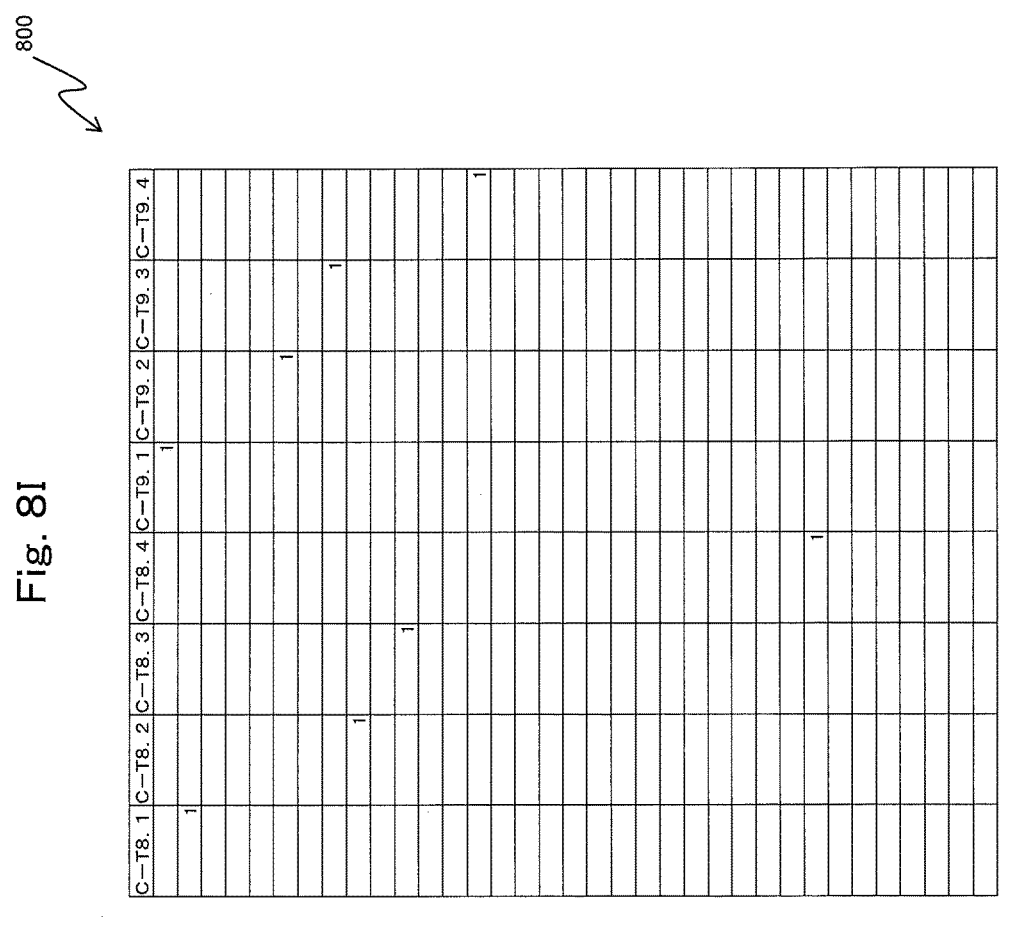

FIGS. 8A to 8I are tables illustrating an example of a failure event-root cause occurrence condition correspondence map 800 used by the failure cause analysis unit 208.

This map can be automatically or manually generated by integrating the information items illustrated in FIGS. 4 to 7.

FIGS. 8A to 8I illustrate tables obtained by dividing one table in the lateral direction. This information is a table for extracting the root cause occurrence condition number 501 from the generated failure event (number) 701 and "1" is stored in an extracted item. As can be seen from the drawings, in some cases, a plurality of root cause occurrence condition numbers 501 are extracted from one failure event 701. This means that the root causes of a failure are not narrowed down to one only by one failure event.

<Root Cause Event Number-Additional Action Correspondence Table>

FIGS. 9A and 9B are diagrams illustrating a root cause event number-additional action correspondence table 900 which is a portion of the additional action determination scenario 211. This information is a correspondence table which is used by the additional action determination unit 203 to specify an additional action (an additional action number 902 and additional action content 903) for further performing narrowing-down from a root cause event (estimated root cause) number 401 and a narrowing-down level 901. The narrowing-down level 901 will be described in detail below.

<Additional Action List>

FIG. 10 is a table illustrating an additional action list 1000 which is a portion of the additional action execution, scenario 212. In this information, detailed action content 903 and an execution method 1001 are stored so as to correspond to the additional action number 902.

<Additional Action-Failure Event Number Correspondence Table>

FIGS. 11A and 11B are diagrams illustrating a correspondence table among the additional action number 902, the additional action content 903, and a failure event number that is the result of the additional action, which is a portion of the additional action execution scenario 212. This information is a table in which the results of additional actions are associated as a failure event number 1101 and failure event content 1102 with the additional actions.

<Failure Cause Isolation Process>

Figure 12A:
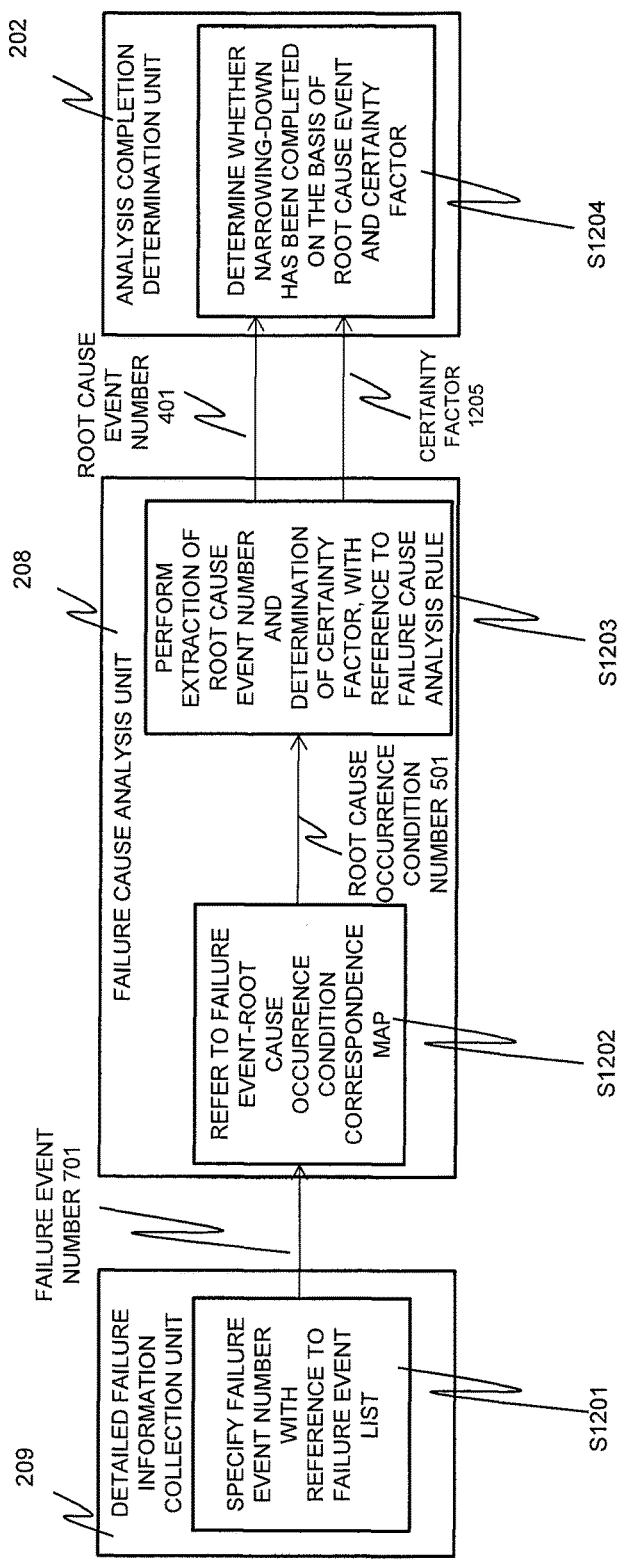
FIG. 12A is a diagram illustrating the outline of the flow of a failure cause isolation process according to this embodiment.
Figure 12B:
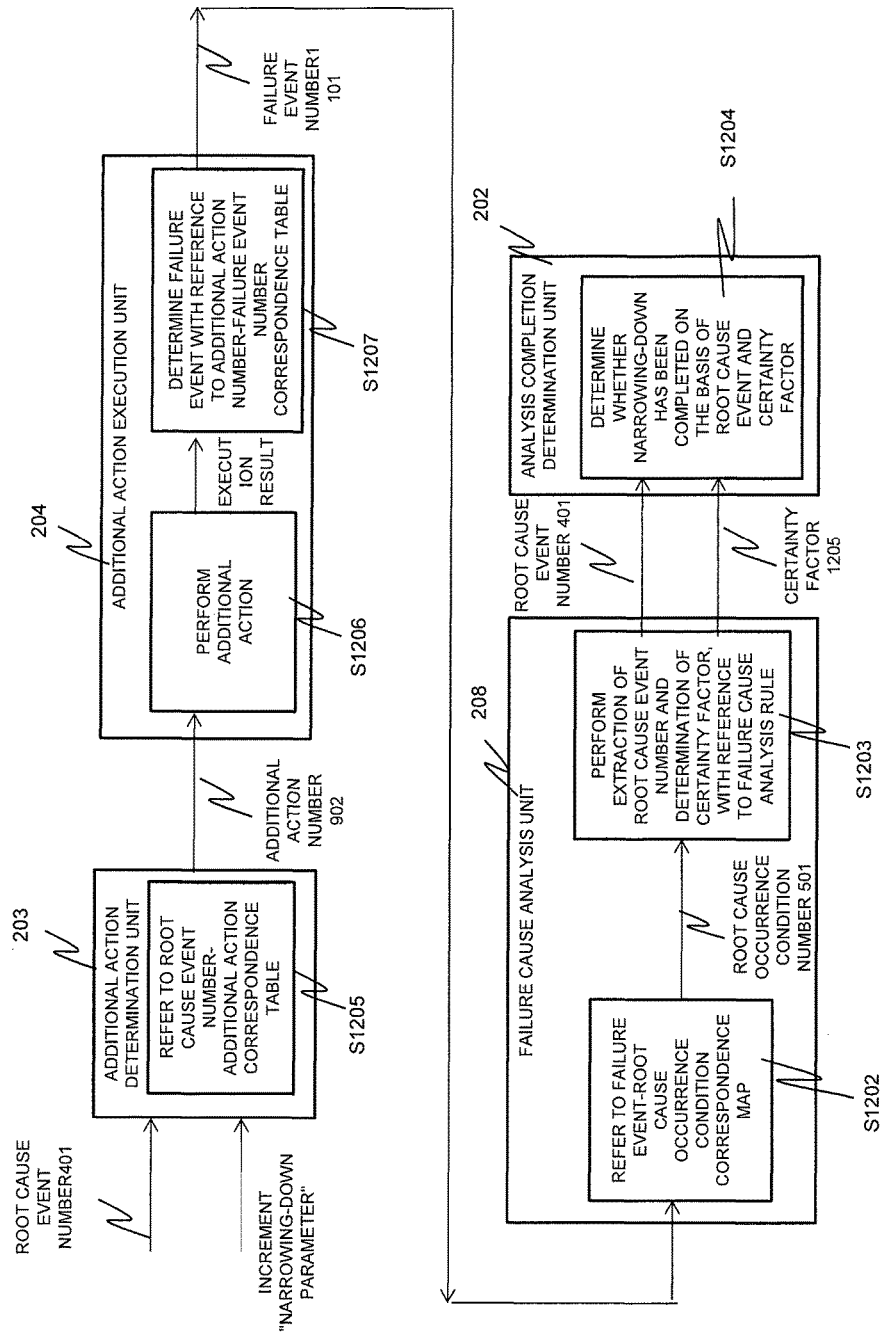
FIG. 12B is a diagram illustrating the outline of the flow of the failure cause isolation process according to this embodiment (which follows FIG. 12A)

FIGS. 12A and 12B are diagrams illustrating the outline of the flow of a failure cause isolation process according to this embodiment. In FIG. 12A, the flow of a process from the detection of an initial failure to the determination of the completion of narrowing-down and the role of each table will be described with reference to FIGS. 2 to 11B.

In this embodiment, it is assumed that an initial failure is detected by a "connection check signal P1 between a server and client 1" or a "connection check signal P2 between a server and client 2" illustrated in FIG. 3.

It is assumed that the failure monitoring unit 207 of the management server illustrated in FIG. 2 monitors a monitoring target 201 using a known method and collects the monitoring result. The collected monitoring result is transmitted to the detailed failure information collection unit 209 under the control of the failure multi-stage analysis management unit 206. The detailed failure information collection unit 209 specifies the failure event number 701 with reference to the failure event list table 700 (see FIG. 7) and informs the failure multi-stage analysis management unit 206 of the failure event number 701 (S1201). The failure multi-stage analysis management unit 206 manages all of the processes such that the processes of each unit (module) are sequentially performed. Hereinafter, in some cases, the description of the failure multi-stage analysis management unit 206 is omitted.

The failure cause analysis unit 208 extracts a root cause and a certainty factor from the failure event number 701. For this process, the failure cause analysis unit 208 specifies the root cause occurrence condition number 501 corresponding to the generated failure event 701, with reference to the failure event-root cause occurrence condition correspondence map 800 (see FIG. 8) (S1202).

Then, the failure cause analysis unit 208 extracts the root cause event number 401 in which one or a plurality of root cause occurrence conditions (numbers) 501 which have been extracted on the basis of the failure event-root cause occurrence condition correspondence map 800 (see FIG. 8) are established, with reference to the failure cause analysis rule 214 (see FIGS. 5A to 6B), and determines a certainty factor (S1203). In some cases, there are a plurality of root causes. In this case, a certainty factor of less than 100% is calculated.

The root cause event number 401 and a certainty factor 1205 are transmitted to the analysis completion determination unit 202. The analysis completion determination unit 202 determines whether analysis has been completed. A detailed example of the content of determination will be described below with reference to FIG. 13.

In FIG. 12B, the role of each table and the flow of a process when the analysis completion determination unit 202 determines that the narrowing-down of the root causes has not been completed will be described.

When the analysis completion determination unit 202 determines that the analysis has not been completed, a narrowing-down parameter (a parameter which is used during a process and is compared with the narrowing-down level 901 illustrated in FIG. 9 by the additional action determination unit 203 in the subsequent process) is incremented and the narrowing-down parameter and the root cause event number 401 are input to the additional action determination unit 203. When the analysis has been completed, the narrowing-down parameter is reset and the root cause event number 401 and the certainty factor 1205 are transmitted to the failure analysis result output unit 205. The failure analysis result output unit 205 outputs the root cause event number 401 and the certainty factor 1205 to a user interface (for example, a CUI or a GUI) of the output device.

The additional action determination unit 203 extracts the additional action number 902 corresponding to the input root cause event number 401 and the input narrowing-down parameter, using the root cause event number-additional action correspondence table 900 (see FIG. 9) (S1205). The designation of the narrowing-down level 901 by the narrowing-down parameter has an effect of narrowing down actions, without performing all of the actions at one time, and performing minimum required actions.

For example, as illustrated in FIG. 9A, when the root cause event number is L1 and the narrowing-down level is 4, there are two types of additional action numbers AC-TNS1.3 and AC-TNR1A.1. However, as such, when there are a plurality of actions with the same priority, all of the actions are regarded as additional actions to be performed and all of the additional action numbers are extracted.

As described above, for the narrowing-down parameter, the failure multi-stage analysis management unit 206 manages the number of loops as a parameter (for example, a natural number of 1, 2, or 3). In an initial state, when analysis is completed, the narrowing-down parameter is reset to a default (for example, 1). When the analysis completion determination unit determines that the narrowing-down of the root causes has not been completed, the narrowing-down parameter is incremented (for example, to 2 or 3) and is then input to the additional action determination unit 203.

The additional action execution unit 204 executes the additional action content 903 according to the additional action number 902 extracted by the additional action determination unit 203, with reference to the additional action list 1000 (see FIG. 10) (S1206).

An event which is the result of the additional action is collected by the failure monitoring unit 207 of the management server illustrated in FIG. 2, similarly to the first action. The monitoring result is transmitted to the additional action execution unit 204 under the control of the failure multi-stage analysis management unit 206. The additional action execution unit 204 specifies a failure event number 1101 with reference to an additional action number-failure event number correspondence table 1100 (see FIGS. 11A and 11B) which is a portion of the additional action execution scenario 212 (S1207).

When the additional action determination unit 203 designates a plurality of additional action numbers 902, the additional action execution unit 204 executes all of the additional action numbers 902 and outputs a plurality of failure event numbers 1107, which are the execution results of the additional action numbers 902, at the same time. In this case, the additional action execution unit 204 outputs the failure event numbers 1107 at the same time after all of the actions are completed. Therefore, it is possible to prevent analysis errors caused by some information.

The failure event number 1101 is transmitted to the failure cause analysis unit 208. The processes of the failure cause analysis unit 208 and the analysis completion determination unit 202 are the same as those described with reference to FIG. 12A. These processes are sequentially performed by the failure multi-stage analysis management unit 206.

The above-mentioned processes are repeated in a loop. When the analysis completion determination unit 202 determines that the analysis has not been completed, the narrowing-down parameter is incremented. The narrowing-down parameter and the root cause event number 401 are input to the additional action determination unit 203 and the next additional action process is continuously performed.

When the analysis completion determination unit 202 determines that the analysis has been completed, the narrowing-down parameter is reset and the root cause event number 401 and the certainty factor are transmitted to the failure analysis result output unit 205. Then, the process ends.

<Analysis End Determination Process>

Figure 13:
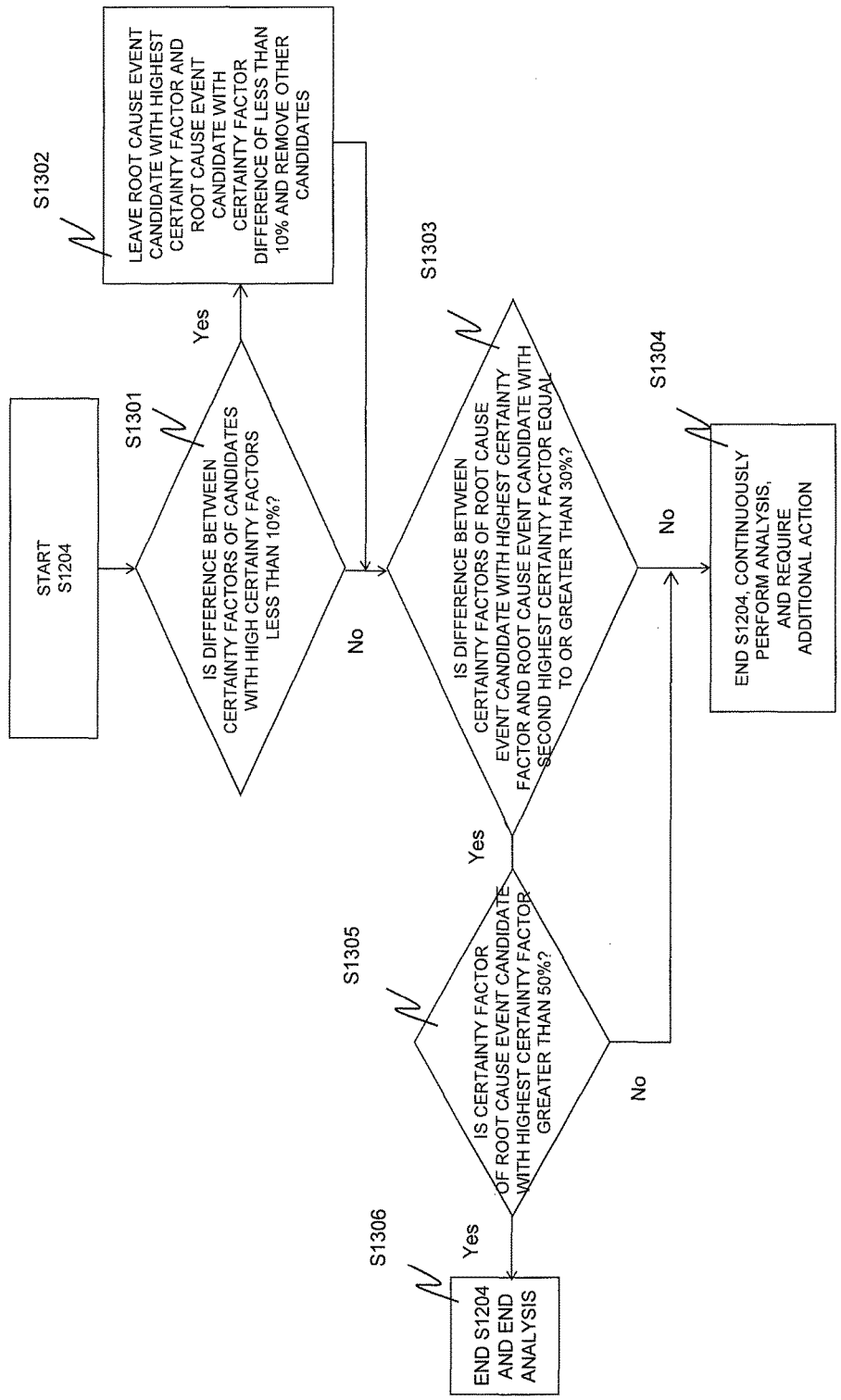
FIG. 13 is a flowchart illustrating an example of the flow of an analysis end determination process (S1204)

FIG. 13 is a flowchart illustrating an example of the flow of an analysis end determination process (S1204) of the analysis completion determination unit 202. In this embodiment, first, as a narrowing-down execution criterion, it is determined whether there is a root cause event candidate of which the certainty factor difference from the root cause event candidate with the highest certainty factor is less than 10% (S1301). When the root cause event candidate is present, the root cause event candidate with the highest certainty factor and the root cause event candidate having a certainty factor difference of less than 10% remain and the other candidates are removed (S1302). Then, the process proceeds to Step S1303. When the root cause event candidate is not present, the process proceeds to S1303.

In S1303, it is determined whether the difference between the certainty factor of the root cause event candidate with the highest certainty factor and the certainty factor of a root cause event candidate with the second highest certainty factor is equal to or greater than 30%. When the difference between the certainty factors is not equal to or greater than 30%, analysis is continuously performed and an additional action is required. Then, the process in S1204 ends (S1304). When the root cause event candidate having a certainty factor difference of less than 10% remains and the other candidates are removed in S1302, an additional action is required. Therefore, in S1302, it is possible to remove the candidates with a low certainty factor and to improve the efficiency of the subsequent process.

When the difference between the certainty factors is equal to or greater than 30%, it is determined whether the certainty factor of the root cause event candidate with the highest certainty factor is greater than 50% (S1305). When the certainty factor is greater than 50%, it is determined that a candidate with a sufficiently high certainty factor remains and the analysis ends. Then, the process in S1204 ends (S1306). When the certainty factor is not greater than 50%, the analysis is continuously performed and an additional action is required. The process in S1204 ends (S1304).

The numerical values illustrated in FIG. 13 are illustrative and can appropriately change depending on the properties or purpose of the system. For example, the input device of the management server 200 may include an interface which can set and change numerical values and the operator can operate the interface to change numerical values. In addition, the flow of the determination process is not limited to the example illustrated in FIG. 13 and other methods may be used.

Figure 14:
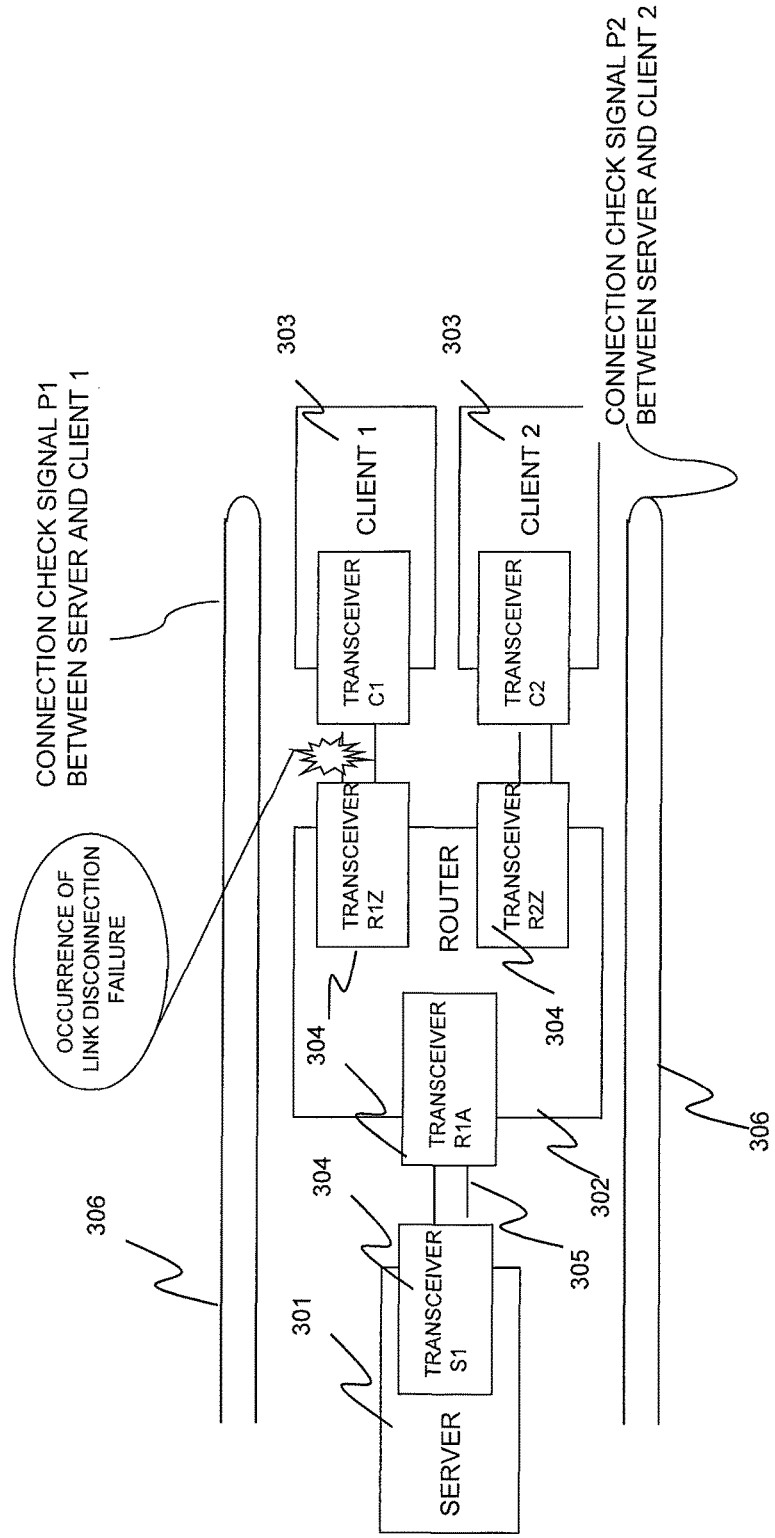
FIG. 14 is a conceptual diagram illustrating an example of the determination of a failure assumed in Embodiment 1.

FIG. 14 is a diagram illustrating an example of the determination of a failure which is assumed in this embodiment. In this embodiment, a link disconnection state is given as an example of the failure which is assumed in the topology illustrated in FIG. 3. The operation in this embodiment which has been described above will be described as a detailed example again.

<Narrowing-Down Level 1>

First, at narrowing-down level 1 (a first action and an event), the server 301 detects signal interruption on the basis of the connection check signal P1 (two ways) from client 1.

The detected information is detected by the management server 200 and the detailed failure information collection unit 209 specifies the detected information as "failure event=EV-LNP1.1" with reference with the failure event list table 700 (FIG. 7) (Step S1201 in FIG. 12A).

The specified failure event number 701 is transmitted to the failure cause analysis unit 208. The failure cause analysis unit 208 extracts "root cause occurrence conditions=C-L1.1A, C-L2.1A, C-L3.1, C-L4.1, C-T1.1A, C-T2.1A, C-T3.1A, C-T4.1A, C-T5.1, C-T6.1, C-T9.1, and C-T10.1" (a total of 12 conditions) corresponding to the "failure event EV-LNP1.1", with reference to the failure event-root cause occurrence condition correspondence map 800 (FIG. 8) (Step S1202 in FIG. 12A).

In addition, the failure cause analysis unit 208 extracts "root cause events=L1, L2, L3, L4, T1, T2, T3, T4, T5, T6, T9, T10" (a total of 12 root causes) which have a possibility to be generated by the root cause occurrence conditions, with reference to the failure cause analysis rule 214, and calculates certainty factors (Step S1203 in FIG. 12A).

In this case, as an example of the calculation of the certainty factors, when a certainty factor of 100% (without any question) is considered, the certainty factor of each root cause is 8.3% (=100/12) since there are 12 root causes. As a result, for example, when the process conditions illustrated in FIG. 13 are used in Step S1204 of FIG. 12A, it is determined that narrowing-down has not been completed and analysis is continuously performed.

<Narrowing-Down Level 2>

Then, at narrowing-down level 2 (a second action and an event), signal interruption (two-way signal) is detected between the router 302 and client 1. At narrowing-down level 2, the failure multi-stage analysis management unit 206 increments the narrowing-down parameter and sets the narrowing-down parameter to "2".

The root cause event number 401 and the narrowing-down parameter "2" are input to the additional action determination unlit 203. The additional action determination unit 203 specifies the additional action number 902 from the root cause event number 401, with reference to the root cause event number-additional action correspondence table 900 (FIG. 9) (Step S1205 in FIG. 12B).

When the root cause event number is L1, L2, L3, L4, T1, T2, T3, T4, T5, T6, T9, and T10 and the additional action number of narrowing-down level 2 is extracted, L1:AC-LNS1.1, L2:AC-LNS1.1, L3:AC-LNS2.1, L4:AC-LNS2.1, T1:AC-LNS1.1, T2:AC-LNS1.1, T3:AC-LNS1.1, T4:AC-LNS1.1, T5:AC-LNS2.1, T6:AC-LNS2.1, T9:AC-LNS2.1, and T10:AC-LNS2.1 are extracted.

Since the same action (AC-LNS1.1 and AC-LNS2.1) is redundantly designated, two types of actions, that is, AC-LNS1.1 and AC-LNS2.1 are instructed to be executed. In this way, when a plurality of root cause events designate a plurality of actions, the same action is not instructed to be executed a plurality of times, but the minimum required actions may be instructed to be executed.

The additional action execution unit 204 executes the additional action which is instructed to be executed (Step S1206 in FIG. 12B). The additional action execution unit 204 searches the additional action list 1000 (FIG. 10), using the additional action number 902 as a key, and executes the corresponding additional action content 903 according to the execution method 1001. According to this embodiment, the additional action numbers are "AC-LNS1.1 (connection check (two ways) between the server and the router)" and "AC-LNS2.1 (connection check (two-way signal) between the router and client 1)" and are executed. A detailed execution method is based on a known technique.

Failure events from the results of the additional actions are specified by the additional action number-failure event number correspondence table 1100 (FIGS. 11A and 11B). In this embodiment, the result of the additional action "AC-LNS1.1" is continuity (EV-LNS1.1p) and the result of the additional action "AC-LNS2.1" is the loss of continuity (EV-LNS2.1) (Step S1207 in FIG. 12B).

The failure event number 1101 is transmitted to the failure cause analysis unit 208. The failure cause analysis unit 208 specifies "root cause occurrence conditions corresponding to the failure event EV-LNS1.1p=nothing" and "root cause occurrence conditions corresponding to EV-LNS2.1=C-L3.2, C-L4.2, C-T10.2, C-T5.2, C-T6.2, and C-T9.2 (a total of six conditions)", with reference to the failure event-root cause occurrence condition correspondence map 800 (FIG. 8) (Step S1202 in FIG. 12B).

In addition, the failure cause analysis unit 208 extracts "root cause events=L3, L4, T5, T6, T9, and T10 (a total of six root causes) which have a possibility to be generated by the root cause occurrence conditions and calculates certainty factors (Step S1203 in FIG. 12A).

As an example of the calculation of the certainty factors, 100% is divided by 6 and a root cause of 16.7% is obtained (Step S1203 in FIG. 12A). As a result, it is determined that narrowing-downing has not been completed and analysis is continuously performed (Step S1204 in FIG. 12A).

<Narrowing-Down Level 3>

Then, at narrowing-down level 3, signal interruption in a direction from the router to client 1 is detected. The narrowing-down parameter is incremented to "3".

Additional actions are specified from the root cause events (Step S1205 in FIG. 12B). "L3:AC-LNS2.2, L4:AC-LNS2.3, T5:AC-LNS2.2, T6:AC-LNS2.3, T9:AC-LNS2.3, and T10:AC-LNS2.2" corresponding six conditions, which are the results of narrowing-down level 2, are extracted.

However, since the same action (AC-LNS2.2 and AC-LNS2.3) is redundantly designated, two types of actions, that is, AC-LNS2.2 and AC-LNS2.3 are instructed to be executed. In this way, when a plurality of root cause events designate a plurality of actions, the same action is not instructed to be executed a plurality of times, but the minimum required actions may be instructed to be executed.

The additional action is executed (Step S1206 in FIG. 12B). Here, an "additional action AC-LNS2.2 (the generation of a connection check signal in the direction from the router to client 1 (one-way signal))" and an "additional action AC-LNS2.3 (the generation of a connection check signal in the direction from client 1 to the router (one-way signal))" are executed.

A failure event is determined from the results of the additional actions (Step S1207 in FIG. 12B). The result of the additional action "AC-LNS2.2 (EV-LNS2.2)" is the loss of continuity and the result of the additional action "AC-LNS2.3 is continuity (EV-LNS2.3p)".

The root cause occurrence conditions corresponding to the failure event are extracted (Step S1202 in FIG. 12B). The root cause occurrence conditions corresponding to a "failure event EV-LNS2.2=C-L3.3, C-T10.3, and C-T5.3 (a total of 3 conditions)" and "root cause occurrence conditions corresponding to a failure event EV-LNS2.3p=nothing" are obtained.

"Root cause events=L3, T5, and T10 (a total of 3 root causes)" which have a possibility to be generated by the root cause occurrence conditions are extracted (Step S1203 in FIG. 12B). As an example of the calculation of a certainty factor, 100% is divided by 3 to obtain a certainty factor of 33.3%. As a result, it is determined that narrowing-down has not, been completed and analysis is continuously performed (Step S1204 in FIG. 12B).

<Narrowing-Down Level 4>

Then, at narrowing-down level 4, the device information of the router and client 1 is acquired. As a result, since there is no failure in the devices, it is determined that link disconnection has occurred in the direction of the router to client 1. The narrowing-down parameter is incremented to "4".

Additional actions are specified from the root cause events (Step S1205 in FIG. 12B). "L3:AC-TNR1Z.2" and "AC-TNC1.1, T5:AC-TNR1Z.2, and T10:AC-TNC1.1" are extracted.

However, since the same action (AC-TNR1Z.2 and AC-TNC1.1) is redundantly designated, two types of actions, that is, AC-TNR1Z.2 and AC-TNC1.1 are instructed to be executed.

In the execution of additional actions (Step S1206 in FIG. 12B), an "additional action AC-TNR1Z.2 (the collection of an abnormality alert from a transceiver R1Z in the router)" and an "additional action AC-TNC1.1 (the collection of an abnormality alert from a receiving unit of the transceiver C1 in client 1)" are executed.

A failure event is determined from the result (Step S1207 in FIG. 12B). The result of the additional action is "AC-TNR1Z.2 is normal (EV-TNR1Z.2p)" and the result of the additional action is "AC-TNC1.1 is normal (EV-TNC1.1p)".

A "root cause occurrence condition=C-L3.4A," corresponding to the failure event EV-TNR1Z.2p and a "root cause occurrence condition=C-L3.4B" corresponding to the failure event EV-TNC1.1p (a total of two conditions) are obtained with reference to the failure event-root cause occurrence condition correspondence map 800 (Step S1202 in FIG. 12B).

When a root cause event which has a possibility to be generated by the root cause occurrence conditions is extracted, a "root cause event=L3 (a total of one root cause)" is extracted.

The certainty factor of the root cause event is 100% (=100%/1). As a result, narrowing-down is completed (Step S1204 in FIG. 12B).

<Component Management Table>

Figure 15:
FIG. 15 is a diagram illustrating an example of a component management table.

FIG. 15 is a diagram illustrating an example of a management table 1500 for managing components. Each component is managed using the component management table 1500. The component management table 1500 may be a set of a plurality of tables, as illustrated in FIG. 15, or may have other formats. For example, when an IP address is used and the component has device information, the component management table 1500 is referred to in the additional action. The following is an example in this embodiment. For example, the administrator sets the component management table in advance and stores the component management table in a storage device of the management server.

The transceiver gives IDs to each of the receiving unit and the transmitting unit. Specifically, the information of a failure information storage area is acquired, the state of a failure is determined, and the unit of execution for outputting the result (for example, a module or a library) is designated.

The granularity of the component is arbitrary. For example, the transceiver is located below the server. In addition, the transceiver may have high granularity or low granularity. In addition, the component may be a physical component or a virtual component.

Embodiment 2

Embodiment 2 of the invention can be applied to a virtual network or a non-virtual network. In addition, each information item illustrated in FIGS. 4 to 11B is corrected to respond to a change in topology. The correction may be manually performed or the information may be automatically updated.

A response to a dynamic change in topology will be described as Embodiment 2. Embodiment 2 is an example of a method which provides a link connection relationship management table for managing a link connection relationship and automatically updates each information item illustrated in FIGS. 4 to 11B from the link connection relationship management table.

Figure 16:
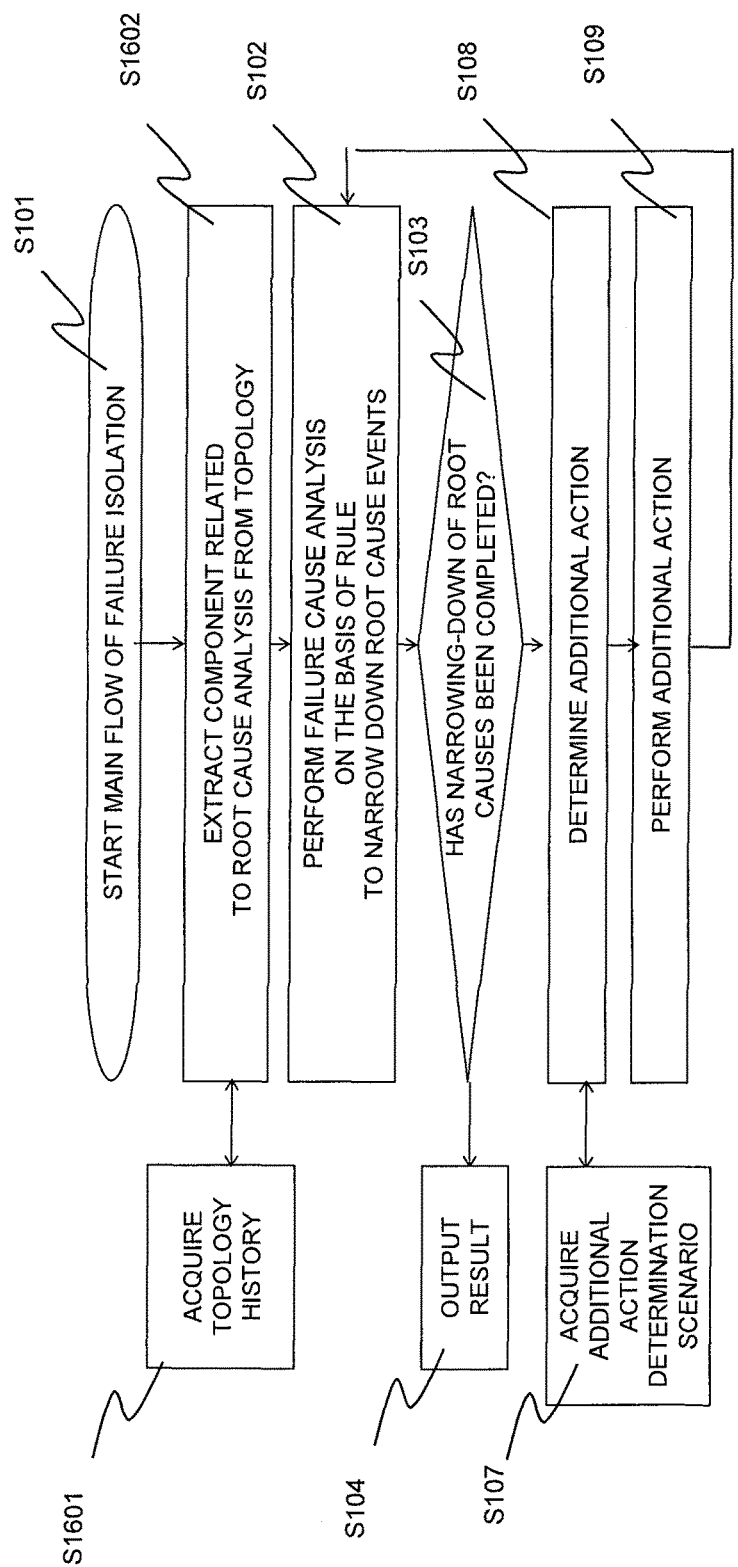
FIG. 16 is a flowchart illustrating the outline of the overall flow of Embodiment 2.

FIG. 16 is a flowchart illustrating the outline of the entire process of Embodiment 2. The same structures as those in FIG. 1 are denoted by the same reference numerals and the description thereof will not be repeated. Embodiment 2 includes a process which acquires a topology history (S1601). The topology is information indicating the relationship between components (elements) forming a system. The topology history is information including the history of a dynamic change in the topology when the topology is dynamically changed. In the example illustrated in FIG. 16, it is assumed that, when the topology is dynamically changed, the latest topology which is acquired at that time is used. The component may be a physical component (physical server) or a virtual component (a virtual server on the physical server). The relationship between the components may be a physical relationship or a virtual (logical) relationship.

The topology information is generally required to manage the system. A technique in which the management server automatically collects the topology information has been known.

Embodiment 2 includes a process in which a topology is acquired (S1601) and a component related to root cause analysis is extracted from the topology (S1602). A process after Step S102 is performed on the basis of the component.

Figure 17:
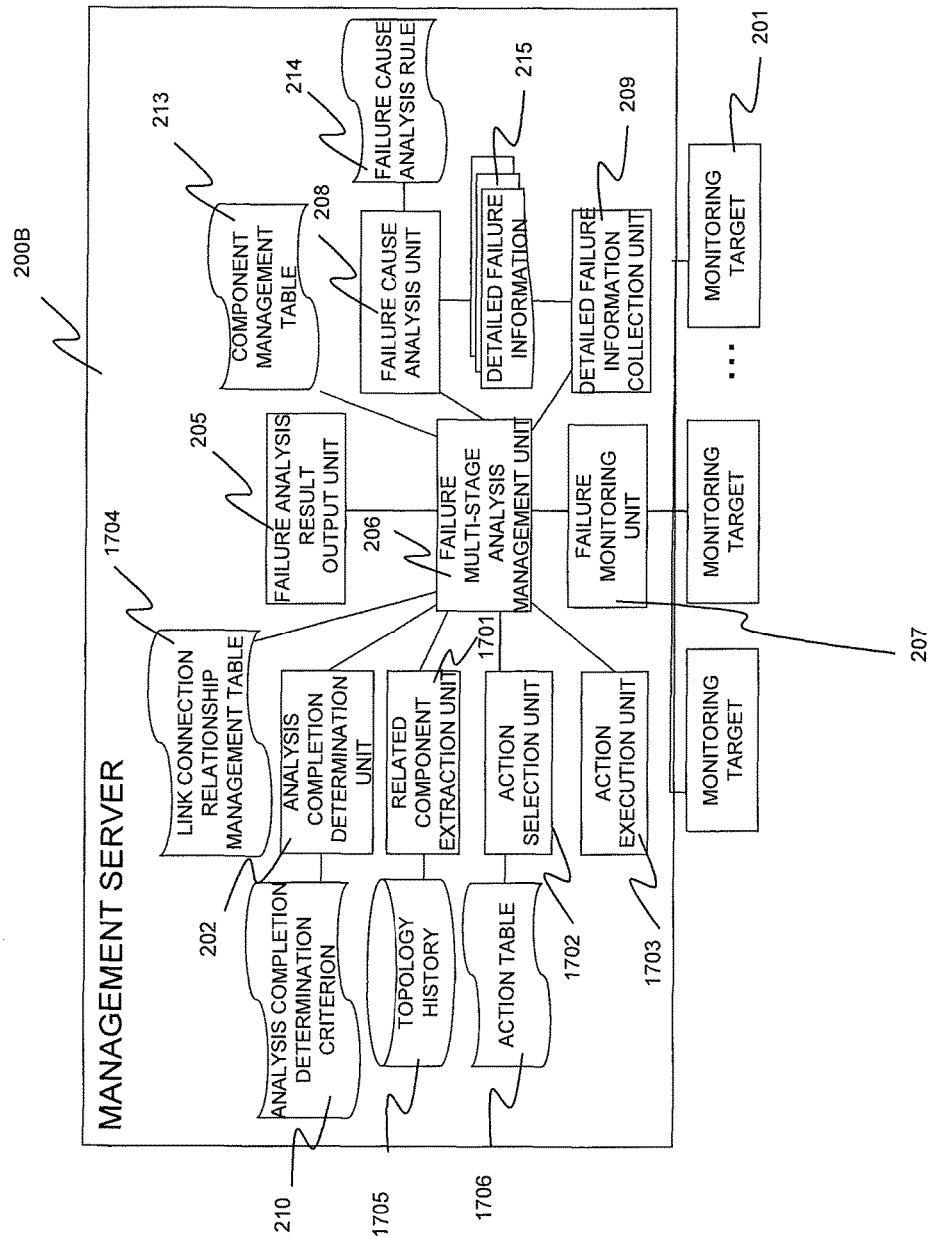
FIG. 17 is a block diagram illustrating the outline of the overall structure of a system according to Embodiment 2.

FIG. 17 is a diagram illustrating the overall structure of a system according to Embodiment 2. The same structures as those in FIG. 2 are denoted by the same reference numerals and the description thereof will not be repeated. A management server 200B in the system according to Embodiment 2 includes a related component extraction unit 1701, an action selection unit 1702, and an action execution unit 1703. These units can be implemented by software. In addition, the management server 200B includes, as information, a link connection relationship management table 1704, a topology history 1705, and an action table 1706.

Figure 18:
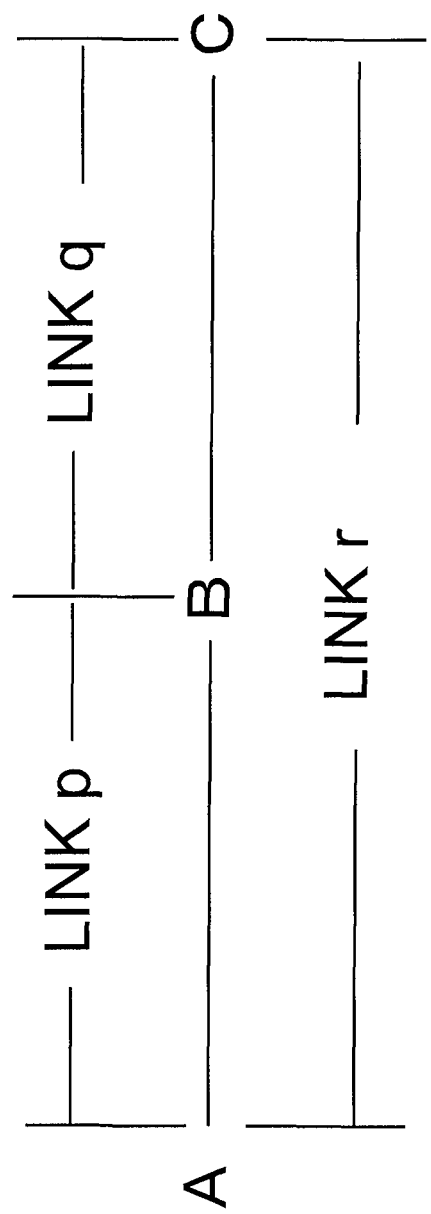
FIG. 18 is a conceptual diagram illustrating the check of a connection relationship in a network topology.

FIG. 18 is a diagram illustrating an example of the concept of checking a connection relationship in a network topology. A set of the connections (also referred to as links) among nodes A, B, and C is considered to define a link including a plurality of links. In the example illustrated in FIG. 18, a link r is considered as a link higher than a link p and a link q.

Directions are distinguished from each other for ease of use of failure isolation and two-way paths are also distinguished and managed for convenience. That is, as links between A and B, there are three types of links, that is, a link from A to B, a link from B to A, and a two-way link between A and B and the links are managed.

In addition, the management server 200B manages a physical port and a transceiver on the path. When there is a low-level link, it is not necessary to manage the low-level link. In the link connection relationship management table 1704, the inclusion relationship between these links is managed.

FIG. 19 is a diagram illustrating an example of the link connection relationship management table 1704. First, the connection relationship between network links is managed, using the link connection relationship management table, in order to respond to a change in topology.

A link has information about a starting point 1901 and an end point 1902. A relation ID 1903 indicates a relation with the failure event (number) 701 which is obtained when a connection check method 1907 is an action. When there is a high-level link, the link connection relationship management table 1704 includes high-level link information 1904. In addition, direction information 1905 includes information indicating one way and information indicating two ways. When there is a physical port on the host link, the physical port is stored as physical port information 1906. In addition, the link connection relationship management table 1704 includes information about the connection check method 1907.

As an example, a case in which client 3 is added will be described.

Figure 20:
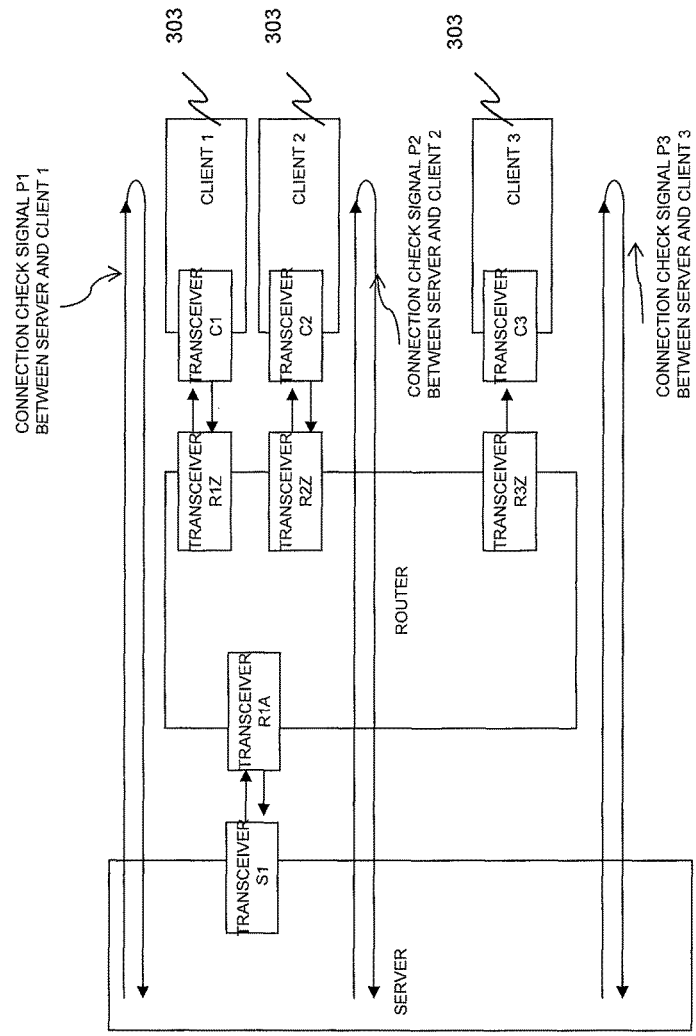
FIG. 20 is a conceptual diagram illustrating the addition of a client assumed in Embodiment 1.

FIG. 20 illustrates a state in which client 3 is added to the structure illustrated in FIG. 3. Client 3 is provided with a transceiver C3 and communicates with the transceiver R3Z of the router.

It is assumed that the management server 200 periodically transmits a connection check signal based on, for example, the ICMP ping protocol to each client 303 to check connection. Therefore, when client 3 is added, the management server can recognize the addition of client 3. In Embodiment 2, the management server 200B can use collected information as a topology history 1705.

FIG. 21 illustrates the result obtained by reflecting the addition result of client 3 in the component management table 1500 illustrated in FIG. 15. A table (f) of client 3 and a table (e) of the transceiver C3 of client 3 and the transceiver R3Z of the router are added. In addition, the mounted transceiver R3Z is added to a table (d) of the router.

As such, in Embodiment 3, topology information which is acquired from the outside can be reflected in the component management table 213 (1500) illustrated in FIG. 17, in response to the addition and change of a component. As a method for implementing the component management table 1500, the component management table 1500 can be described in a table format in advance. Alternatively, a method is considered which converts the format with reference to other databases or automatically checks components and converts the result into the format illustrated in FIG. 15 or FIG. 21.

FIG. 22 illustrates the link connection relationship management table 1704 which is added and changed when additional client 3 is added as illustrated in FIG. 21. An under lined portion is a portion which has been changed as compared with the state (before addition) illustrated in FIG. 19. The addition process may be manually performed. In addition, as described above, a topology structure may be described in the form of a table in advance on the basis of information acquired from the outside or the formation may be automatically converted with reference to other databases. Alternatively, a method is considered which automatically checks the topology and converts the result into the form of this table.

A method that reflects the link connection relationship management table 1704, to which a component is added or in which a component is changed, in each information item illustrated in FIGS. 4 to 11B will be described with reference to FIG. 23.

In the failure event list table 700 (FIG. 7), "EV-" is given and added to the head of the relation ID which has been newly added. In this embodiment, "EV-LNS4.3" is added to the failure event list table 700. As an example of a method for checking the connection of an added portion, a method may be used which checks connection and designates the unit of execution (for example, a module or a library) for outputting the check result.

For the failure cause analysis rule 214 (FIGS. 5A to 6B), a failure cause analysis rule template 2301 is prepared in advance and the characteristics of a link are applied to the failure cause analysis rule template 2301. In FIG. 23, a link failure template is given as an example of the template 2301. It is assumed that the top-level link is not a root cause and the template does not define the top-level link.

The template 2301 is obtained by generalizing the failure cause analysis rule 214 and conditions for the root cause are connected in the order of levels by AND conditions. The levels correspond to narrowing-down and are arranged from a coarse level to a fine level. The levels are sequentially executed to perform narrowing-down.

Figure 23:
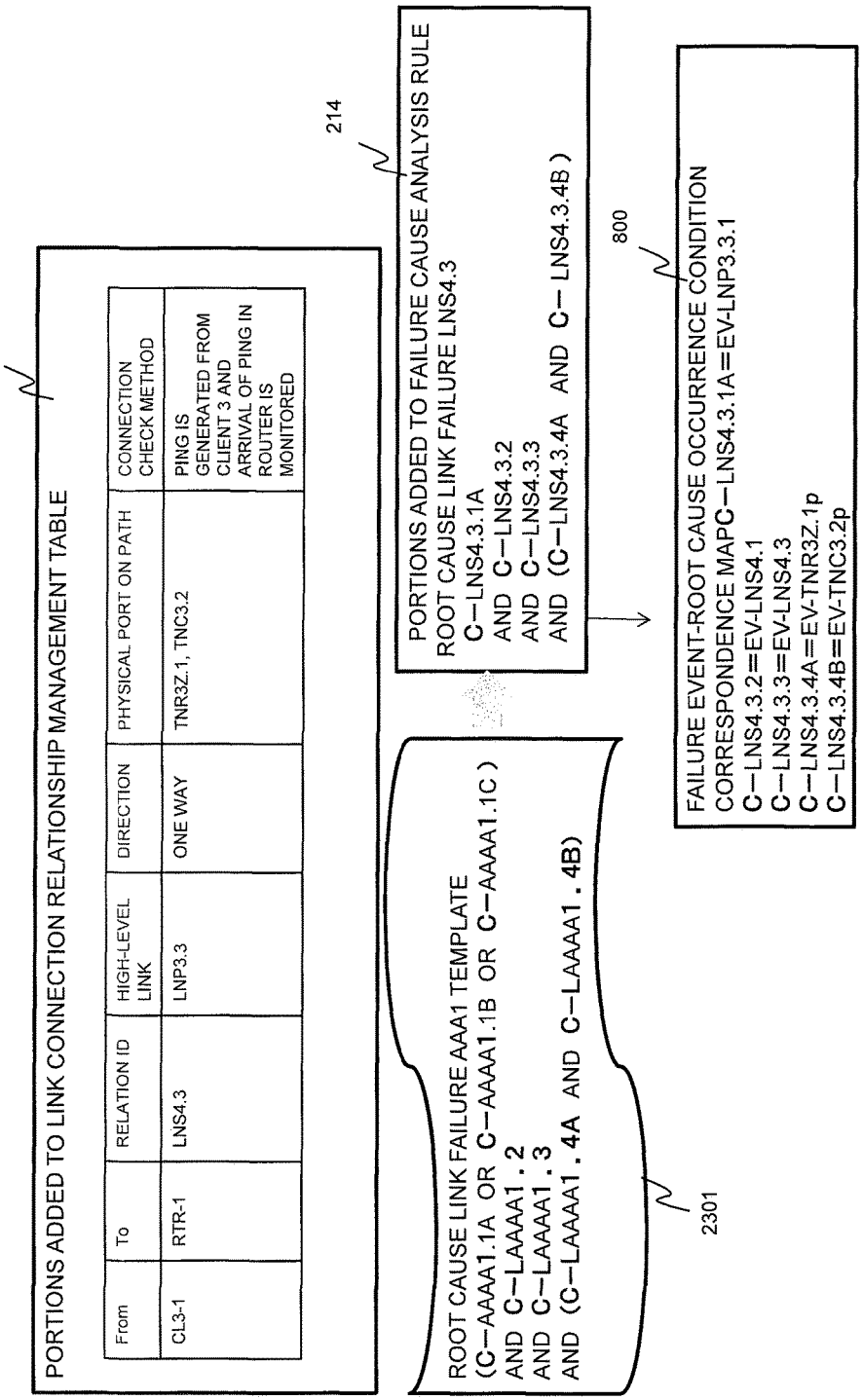
FIG. 23 is a conceptual diagram illustrating a method which reflects the content of the link connection relationship management table in each information item illustrated in FIGS. 4 to 11B.

For the failure cause analysis rule 214 (FIGS. 5A and 5B and FIGS. 6A and 6B), in the example illustrated in FIG. 23, the template 2301 is used and a relation ID "LNS4.3" is used as the root cause. Since the relation ID is independently defined for each direction, the relation ID can be used as the root cause.

Since level 1 is one in a "high-level link" field, it designates one condition "C-LNS4.3.1A" (C is the abbreviation of criterion). Level 2 designates one condition "C-LNS4.3.2" as the two-way connection check of the host link. Level 3 designates one condition "C-LNS4.3.3" as the one-way connection check of the host link. Level 4 designates two conditions "(C-LNS4.3.4A and C-LNS4.3.4B)" as the number of "physical ports on a line". However, the template described in this embodiment is illustrative. The number of levels may increase and five or more levels may be provided. Alternatively, the number of levels may decrease.

As described above, the failure cause analysis rule 214 is added and data is added to the failure event-root cause occurrence condition correspondence map 800 (FIG. 8) on the basis of the added failure cause analysis rule 214.

In the failure event-root cause occurrence condition correspondence map 800 (FIGS. 8A to 8I), "EV-LNP3.3.1", which is a failure in a high-level link "LNP3.3", is designated for the condition "C-LNS4.3.1A" of level 1. In addition, the two-way connection check (suffix 1) "EV-LNS4.1" of the host link is designated for the condition "C-LNS4.3.2" of level 2. The condition "C-LNS4.3.3" of level 3 is the one-way connection check "EV-LNS4.3" of the host link in which a suffix is "3" that is the same as that of the connection ID. The conditions "LNS4.3.4A" and "LNS4.3.4B" of level 4 designate "no abnormality in a physical port on a line (the last letter=p)" and are "EV-TNR3Z.1p" and "EV-TNC3.2p".

Next, a root cause event number-additional action correspondence table 900 is further generated from the failure event-root cause occurrence condition correspondence map 800. Conversion is performed as follows, using EV in the failure event-root cause occurrence condition correspondence map 800 as AC:

C-LNS4.3.1A=EV-LNP3.3.1→level 1 is not necessary;
C-LNS4.3.2=EV-LNS4.1→level 2 AC-LNS4.1;
C-LNS4.3.3=EV-LNS4.3→level 2 AC-LNS4.3;
C-LNS4.3.4A=EV-TNR3Z.1p→level 4 AC-TNR3Z.1; and
C-LNS4.3.4B=EV-TNC3.2p→level 4 AC-TNC3.2.

In correspondence to the conversion, in the additional action list table 1000, an additional action number, additional action content, and an execution method are defined. A newly added connection check method is registered as "AC-" (relation ID)=AC-LNS4.3. As a result, EV-LNS4.3p indicates success and EV-LNS4.3 indicates failure.

As described above, the related component extraction unit 1701 generates and changes the root cause event list (FIG. 4), the failure cause analysis rule (FIGS. 5A and 5B and FIGS. 6A and 6B), the failure event list (FIG. 7), the failure event-root cause occurrence condition correspondence map (FIG. 8), the root cause event number-additional action correspondence table (FIG. 9), the additional action list (FIG. 10), the additional action, and the failure event number correspondence table (FIG. 11A) from the topology history 1705. The items other then the failure cause analysis rule 214 are a portion of the action table 1706. The action selection unit 1702 and the action execution unit 1703 select and execute an action, using the information of the action table 1706. However, this process may be the same as that in Embodiment 2.

Similarly to the above description, a transceiver failure template may be defined for a failure in the transceiver and the root cause event list (FIG. 4), the failure cause analysis rule (FIG. 5, FIG. 6), the failure event list (FIG. 7), the failure event-root cause occurrence condition correspondence map (FIG. 8), the root cause event number-additional action correspondence table (FIG. 9), the additional action list (FIG. 10), the additional action, and the failure event number correspondence table (FIG. 11A) may be generated from the component management table of each transceiver.

Embodiment 3

In Embodiment 3, an example in which a level learning process is performed on the basis of Examples 1 to 2 will be described. In this embodiment, when the analysis completion determination unit 202 determines that the analysis has been completed, narrowed-down root cause event numbers and the narrowing-down level are stored and the appearance frequency of the level is counted. For the level with a high frequency, the narrowing-down level increases to a high narrowing-down level (a narrowing-down level with a small number) and an additional action is executed.

Figure 24:
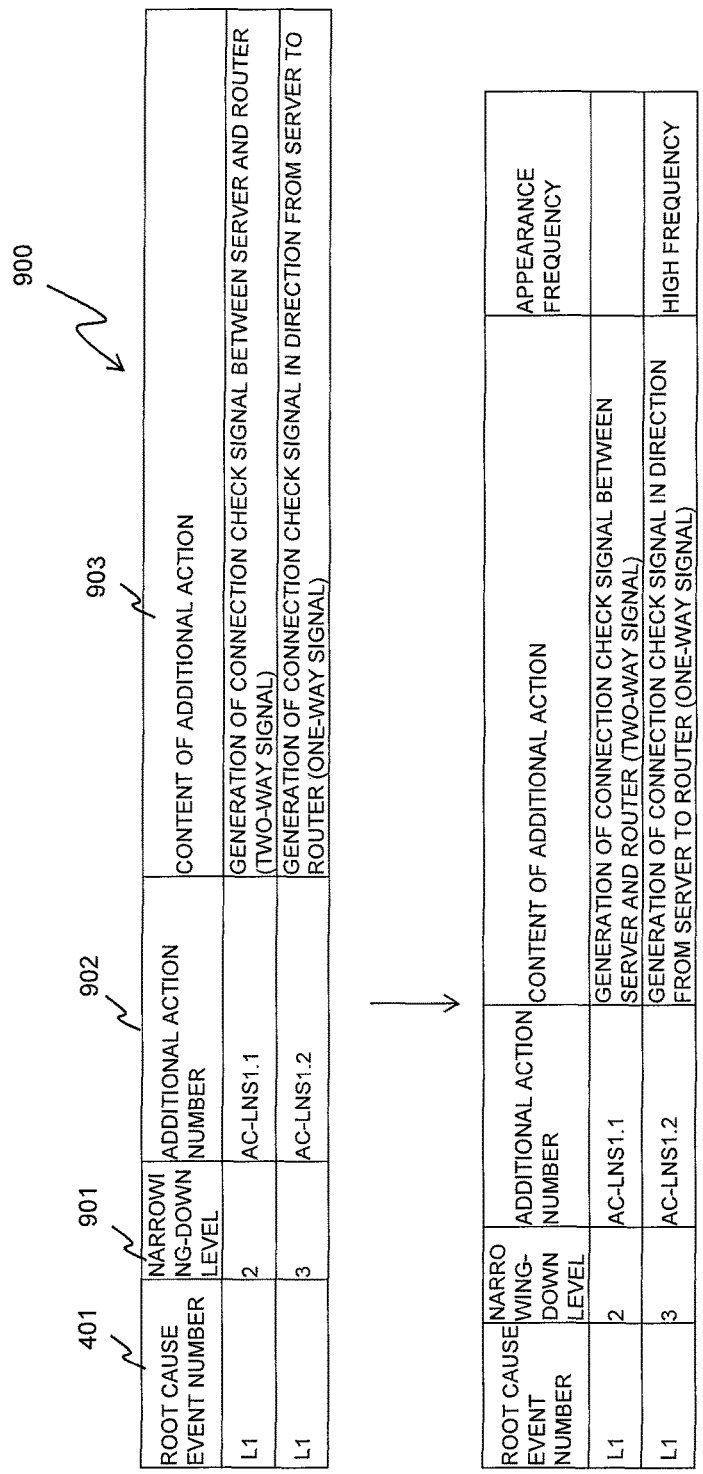
FIG. 24 is a diagram illustrating a root cause event number-additional action correspondence table according to Embodiment 3.

FIG. 24 is a table illustrating the comparison between the configuration of a root cause event number-additional action correspondence table 900 according to Embodiment 3 and the configuration of the root cause event number-additional action correspondence table 900 according to Embodiment 1 (FIG. 9). The configuration of the table according to Embodiment 1 is illustrated on the upper side and configuration of the table according to Embodiment 3 is illustrated on the lower side.

An "appearance frequency" field is added to the right end of the lower table according to Embodiment 3 and is updated when the analysis completion determination unit 202 determines that the analysis has been completed. In the example illustrated in FIG. 23, a "high frequency" flag is stored in the appearance frequency field. The "high frequency" is defined in any way. For example, when the appearance frequency is equal to or greater than 50%, the appearance frequency is defined as a high appearance frequency.

In an additional action corresponding to a root cause event number having the high frequency flag attached thereto, a process which increases the narrowing-down level is performed. For example, when the appearance frequency is determined to be the high frequency, AC-LNS1.2 is executed even at level 3 in the loop process of level 2 and a result event corresponding to AC-LNS1.2 is generated. Therefore, it is possible to give determination priority to the failure which frequently occurs. As a result, narrowing-down is expected to be determined quickly.

Since the appearance frequency is reflected, it is possible to further classify the appearance frequency into levels and to weight the narrowing-down levels in stages.

The above-mentioned structure may be implemented by a single computer or an arbitrary portion of the input device, the output device, the processing device, and the storage device may be implemented by other computers which are connected by a network. This structure is equivalent to the scope and spirit of the invention and is also included in the scope of the invention.

In this embodiment, the same functions as those implemented by software may be implemented by hardware such as a field programmable gate array (FPGA) or an application specific integrated circuit (ASIC). This aspect is also included in the scope of the invention.

The invention is not limited to the above-described embodiments and includes various modifications. For example, a portion of the structure according to a certain embodiment can be substituted with the structures according to other embodiments and the structure according to a certain embodiment can be added to the structures according to other embodiments. In addition, a portion of the structure according to each embodiment can be added to the structures according to other embodiments, can be removed, and can be substituted with the structures according to other embodiments.

INDUSTRIAL APPLICABILITY

The above-described embodiments of the invention can be applied to specify the causes of failure in various systems.

What is claimed is:

1. A failure isolation method that extracts a failure which has a possibility to occur in a monitoring target as a root cause event, comprising:
    an action execution step of executing an action for designating a predetermined operation for the monitoring target and collecting a failure event which is obtained as a result of the action;
    an additional action execution step of executing an additional action for designating a predetermined operation for the monitoring target on the basis of the failure event and collecting an additional failure event which is obtained as a result of the additional action;
    a failure cause analysis step of analyzing the additional failure event on the basis of a predetermined failure cause analysis rule and determining the root cause event and a certainty factor of the root cause event; and
    an analysis completion determination step of determining whether the analysis has been completed, on the basis of the root cause event and the certainty factor of the root cause event.

2. The failure isolation method according to claim 1, wherein, when the certainty factor does not satisfy a predetermined requirement in the analysis completion determination step, the additional action execution step, the failure cause analysis step, and the analysis completion determination step are performed again.

3. The failure isolation method according to claim 2, further comprising:
    an additional action determination step before the additional action execution step,
    wherein the additional action determination step determines an additional action to be executed from the actions at levels corresponding to the number of times the additional action execution step, the failure cause analysis step, and the analysis completion determination step are performed, among additional actions which are classified into levels and are prepared in advance on the basis of the failure event.

4. The failure isolation method according to claim 3, wherein the failure cause analysis rule is information about a list of root cause occurrence conditions corresponding to the root cause event,
    in the failure cause analysis step, the root cause occurrence conditions are extracted using the additional failure event, with reference to a failure event-root cause occurrence condition correspondence map indicating a correspondence between the failure event and the root cause occurrence conditions, and the root cause event and the certainty factor of the root cause event are determined on the basis of the extracted root cause occurrence conditions and the failure cause analysis rule.

5. The failure isolation method according to claim 4, wherein, in the additional action determination step, an additional action corresponding to the root cause event determined in the failure cause analysis step is determined, using a root cause event number-additional action correspondence table in which the root cause event is associated with the additional action.

6. The failure isolation method according to claim 5, wherein, in the analysis completion determination step, it is determined whether the analysis has been completed on the basis of at least one of whether a difference between the certainty factors of a candidate with the highest certainty factor and a candidate with the second highest certainty factor in the root cause event determined in the failure cause analysis step satisfies a predetermined requirement and whether the certainty factor of the candidate with the highest certainty factor satisfies a predetermined requirement.

7. The failure isolation method according to claim 5, wherein, in the analysis completion determination step, when a difference between the certainty factor of a candidate with the highest certainty factor and the certainty factors of other candidates in the root cause event determined in the failure cause analysis step is less than a predetermined threshold value, a candidate of which the certainty factor difference from the candidate with the highest certainty factor is less than the predetermined threshold value remains and the other candidates are removed.

8. The failure isolation method according to claim 5, wherein the root cause event number-additional action correspondence table includes appearance frequency information,
the appearance frequency information includes information corresponding to the appearance frequency of the root cause events which are narrowed down when it is determined in the analysis completion determination step that the analysis has been completed, and
in the additional action determination step, an additional action is determined on the basis of the appearance frequency information.

9. The failure isolation method according to claim 5, wherein topology information indicating a relationship between the monitoring targets is acquired, and
the failure cause analysis rule, the failure event-root cause occurrence condition correspondence map, and the root cause event number-additional action correspondence table are added or corrected on the basis of the topology information.

10. A failure isolation method that extracts a failure which has a possibility to occur in a monitoring target as a root cause event, comprising:
a first step of performing a predetermined action for the monitoring target, collecting a failure event which is a result of the action, applying the failure event to a failure cause analysis rule, and narrowing down the root cause events together with certainty factors;
a second step of determining whether the root cause event and the certainty factor narrowed down in the first step satisfy a predetermined requirement and whether the narrowing-down has been completed; and
a third step of, when it is determined in the second step that the narrowing-down has not been completed, performing a predetermined additional action for the monitoring target, collecting an additional failure event which is a result of the additional action, applying the additional failure event to the failure cause analysis rule, and narrowing down the root cause events together with the certainty factors,
wherein the third step is performed as the first step, and the process returns to the second step and is continuously performed until the narrowing-down is completed.

11. A management server for failure isolation that extracts a failure which has a possibility to occur in a monitoring target as a root cause event, comprising:
an action execution module that executes an action for designating a predetermined operation for the monitoring target and collects a failure event which is obtained as a result of the action;
an additional action execution module that executes an additional action for designating a predetermined operation for the monitoring target on the basis of the failure event and collects an additional failure event which is obtained as a result of the additional action;
a failure cause analysis module that analyzes the additional failure event on the basis of a predetermined failure cause analysis rule and determines the root cause event and a certainty factor of the root cause event; and
an analysis completion determination module that determines whether the analysis has been completed, on the basis of the root cause event and the certainty factor of the root cause event.

12. The management server for failure isolation according to claim 11,
wherein, when the analysis completion determination module determines that the certainty factor does not satisfy a predetermined requirement, the additional action execution module, the failure cause analysis module, and the analysis completion determination module are performed their processes again.

13. The management server for failure isolation according to claim 12, further comprising:
an additional action determination module that determines an additional action to be executed from the actions at levels corresponding to the number of times the additional action execution module, the failure cause analysis module, and the analysis completion determination module are performed their processes, among additional actions which are classified into levels and are prepared in advance on the basis of the failure event.

14. The management server for failure isolation according to claim 13,
wherein the failure cause analysis rule is information about a list of root cause occurrence conditions corresponding to the root cause events,
the failure cause analysis module extracts the root cause occurrence conditions, using the additional failure event, with reference to a failure event-root cause occurrence condition correspondence map indicating a correspondence between the failure event and the root cause occurrence conditions, and
the failure cause analysis module determines the root cause event and the certainty factor of the root cause event on the basis of the extracted root cause occurrence conditions and the failure cause analysis rule.

15. The management server for failure isolation according to claim 14, wherein the additional action determination module determines an additional action corresponding to the root cause event determined by the failure cause analysis module, using a root cause event number-additional action correspondence table in which the root cause event is associated with the additional action.

\* \* \* \* \*